(12) United States Patent
Ohta et al.

(10) Patent No.: US 9,049,713 B2
(45) Date of Patent: *Jun. 2, 2015

(54) RADIO COMMUNICATION APPARATUS, RADIO COMMUNICATION SYSTEM AND RADIO COMMUNICATION METHOD

(71) Applicant: FUJITSU LIMITED, Kawasaki-shi, Kanagawa (JP)

(72) Inventors: Yoshiaki Ohta, Yokohama (JP); Yoshihiro Kawasaki, Yokohama (JP); Yoshiharu Tajima, Yokohama (JP); Yoshinori Tanaka, Yokohama (JP); Katsumasa Sugiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,920

(22) Filed: Dec. 1, 2014

(65) Prior Publication Data

US 2015/0087348 A1 Mar. 26, 2015

Related U.S. Application Data

(63) Continuation of application No. 13/567,515, filed on Aug. 6, 2012, now Pat. No. 8,923,872, which is a continuation of application No. PCT/JP2010/052102, filed on Feb. 12, 2010.

(51) Int. Cl.
*H04W 72/00* (2009.01)
*H04W 72/04* (2009.01)
*H04W 74/08* (2009.01)

(52) U.S. Cl.
CPC ........ *H04W 72/042* (2013.01); *H04W 74/0833* (2013.01)

(58) Field of Classification Search
USPC ........... 455/422.1, 450–453, 456.2, 464, 509, 455/510; 370/395.41, 332; 375/E7.141
See application file for complete search history.

(56) References Cited

U.S. PATENT DOCUMENTS

2005/0068922 A1 3/2005 Jalali
2006/0250996 A1 11/2006 Mella et al.
2009/0201865 A1 8/2009 Uemura et al.

FOREIGN PATENT DOCUMENTS

EP 1665683 6/2006
EP 2034755 A1 3/2009
(Continued)

OTHER PUBLICATIONS

3GPP TS 25.301 V8.5.0; 3rd Generation Partnership Project; Technical Specification Group Radio Access Network; Radio Interface Protocol Architecture (Release 8) Mar. 2009.

(Continued)

*Primary Examiner* — Dominic E Rego
(74) *Attorney, Agent, or Firm* — Myers Wolin, LLC

(57) ABSTRACT

A radio communication apparatus selectively performs one of a first transmission method using for data transmission a radio resource which is assigned by a radio communication apparatus and which can be used on a contention basis by a plurality of radio communication apparatus and a second transmission method involving random access. Alternatively, the radio communication apparatus selectively performs one of the first transmission method and a third transmission method involving a request made to the radio communication apparatus to assign a radio resource for data transmission.

12 Claims, 33 Drawing Sheets

(56) References Cited

FOREIGN PATENT DOCUMENTS

| JP | 2007-507174 A | 3/2007 |
|---|---|---|
| JP | 2008-539632 A | 11/2008 |
| JP | 2009-153048 A | 7/2009 |
| JP | 2009-164815 A | 7/2009 |
| JP | 2009-171589 A | 7/2009 |
| WO | 2005/032079 A1 | 4/2005 |
| WO | 2007/139188 A | 12/2007 |

OTHER PUBLICATIONS

Japanese Office Action issued by the Japanese Patent Office for corresponding Japanese Patent Application No. 2011-553695, with Partial English Translation, dated Jul. 9, 2013.

ETRI, "The handling of CB uplink transmission", Agenda Item 7.2, 3GPP TSG-RAN WG2 #68bis, R2-100215, Valencia, Spain, Jan. 18-22, 2010.

3GPP "3rd Generation Partnership Project; Technical Specification Group Radio Access Network; Requirements for further advancements for Evolved Universal Terrestrial Radio Access (E-UTRA) (LTE-Advanced) (Release 8)" TR 36.913 V8.0.1, Mar. 2009.

3GPP TS 36.300 V9.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)" Jun. 2009.

3GPP TS 36.321 V9.1.0, "3rd Generation Partnership Project; Technical Specification Group Radio Access Network; Evolved Universal Terrestrial Radio Access (E-UTRA) Medium Access Control (MAC) protocol specification (Release 9)" Dec. 2009.

3GPP TR 36.912 V9.0.0, "3rd Generation Partnership Project; Technical Specification Group Radio Access Network; Feasibility study for Further Advancements for E-UTRA (LTE-Advanced) (Release 9)" Sep. 2009.

Ericsson et al., "Contention based uplink transmissions", Agenda Item 7.2, 3GPP TSG-RAN WG2 #66bis, R2-093812, Los Angeles, USA, Jun. 29-Jul. 3, 2009.

3GPP TS 36.331 V9.1.0, "3rd Generation Partnership Project; Technical Specification Group Radio Access Network; Evolved Universal Terrestrial Radio Access (E-UTRA) Radio Resource Control (RRC); Protocol specification (Release 9)" Dec. 2009.

International Search Report issued for corresponding International Patent Application No. PCT/JP2010/052102, mailed May 18, 2010.

The extended European Search Report for the corresponding European patent application No. 12179290.7, dated Mar. 6, 2013.

Ericsson et al., "Impacts of contention based uplink in RAN2", Agenda Item 7.2, 3GPP TSG-RAN WG2 #68bis, R2-100125, Valencia, Spain, Jan. 18-22, 2010.

Ericsson et al., "Stage 2 description of the contention based uplink", work item code : LTE_LATRED-Core, Dated Dec. 1, 2010, Agenda Item 7.2, 3GPP TSG-RAN WG2 #68bis, R2-100126, Valencia, Spain, Jan. 18-22, 2010.

RADIO COMMUNICATION APPARATUS, RADIO COMMUNICATION SYSTEM AND RADIO COMMUNICATION METHOD

CROSS-REFERENCE TO RELATED APPLICATION

This application is a continuation application of U.S. application Ser. No. 13/567,515, filed Aug. 6, 2012 now pending, which is a continuation of International Application PCT/JP2010/052102 filed on Feb. 12, 2010, the entire contents of each are incorporated herein by reference.

FIELD

The embodiments discussed herein are related to a radio communication apparatus, a radio communication system, and a radio communication method.

BACKGROUND

At present many radio communication systems, such as portable telephone systems and radio MANs (Metropolitan Area Networks), are used. In addition, in order to further increase the speed and capacity of radio communication, lively discussions on next generation radio communication techniques are being conducted continuously.

For example, 3GPP (3rd Generation Partnership Project) which is a standardization organization proposed a communication standard which is referred to as LTE (Long Term Evolution) and by which communication can be performed by the use of a maximum of 20-megahertz frequency band. Furthermore, 3GPP proposed as a next generation communication standard for LTE a communication standard which is referred to as LTE-A (LTE-Advanced) and by which communication can be performed by the use of a maximum of 100-megahertz frequency band (see, for example, NPTL1).

In many radio communication systems a procedure under which one radio communication apparatus (mobile station, for example) transmits data to the other radio communication apparatus (base station, for example) from a state in which a radio resource used for data transmission is not assigned thereto is stipulated. Examples of such a procedure are (1) method by which random access is performed (see, for example, Paragraph 10.1.5 of NPTL2 or Paragraph 5.1 of NPTL3) and (2) method by which a scheduling request is transmitted (see, for example, Paragraph 5.2.3 of NPTL2 or Paragraph 5.4.4 of NPTL3).

When a mobile station performs random access to a base station, the mobile station transmits a signature which it selects at random from among a plurality of signatures to the base station as a random access preamble. The base station transmits a random access response as a response. After that, the mobile station transmits its identifier to the base station and the base station notifies the mobile station that it can recognize the mobile station. As a result, mobile stations go into a state in which they can be assigned radio resources individually by the base station for data transmission. With this method, however, random access contention may occur among a plurality of mobile stations. This leads to failure in a procedure.

With the method by which a mobile station transmits a scheduling request to a base station, the base station assigns in advance to the mobile station a control channel radio resource for transmitting the scheduling request. The mobile station uses the control channel radio resource for transmitting the scheduling request to the base station. The base station assigns radio resources for data transmission to mobile stations individually and notifies the mobile stations of the radio resource assigned thereto. As a result, each mobile station goes into a state in which it can perform data transmission.

With LTE-A, on the other hand, a reduction in delay time from a dormant state in which data transmission is not performed temporarily because of the intermittence of packet communication to the resumption of data transmission is under examination (see, for example, Paragraph 10.1 of NPTL4). (3) contention based uplink access is proposed as a method for realizing this (see, for example, NPTL5).

With the contention based uplink access from a mobile station to a base station, for example, the base station sets a radio resource (contention based radio resource) which a plurality of mobile stations can share for data transmission, that is to say, a radio resource which is not assigned individually to a plurality of mobile stations. When a mobile station detects the contention based radio resource, the mobile station uses the radio resource for data transmission without receiving particular permission from the base station. This reduces time which elapses before the beginning of data transmission by the mobile station. However, data transmission contention may occur among a plurality of mobile stations. This leads to failure in a procedure.

NPTL1: 3GPP (3rd Generation Partnership Project), "Requirements for Further Advancements for Evolved Universal Terrestrial Radio Access (E-UTRA) (LTE-Advanced) ", 3GPP TR 36.913, V8.0.1, 2009-03.

NPTL2: 3GPP (3rd Generation Partnership Project), "Evolved Universal Terrestrial Radio Access (E-UTRA) and Evolved Universal Terrestrial Radio Access Network (E-UTRAN); Overall description", 3GPP TS 36.300, V9.0.0, 2009-06.

NPTL3: 3GPP (3rd Generation Partnership Project), "Evolved Universal Terrestrial Radio Access (E-UTRA) Medium Access Control (MAC) protocol specification", 3GPP TS 36.321, V9.1.0, 2009-12.

NPTL4: 3GPP (3rd Generation Partnership Project), "Feasibility study for Further Advancements for E-UTRA (LTE-Advanced)", 3GPP TR 36.912, V9.0.0, 2009-09.

NPTL5: 3GPP (3rd Generation Partnership Project), "Contention based uplink transmissions", 3GPP TSG-RAN WG2 #66bis R2-093812, 2009-06.

As stated above, there are a plurality of methods for beginning data transmission from a state in which a radio resource used for data transmission is not assigned individually. However, how to use these access methods is problematic. In particular, if a contention based radio resource is set as proposed in the above NPTL5, the relationship between the method using the contention based radio resource and the other access methods is problematic.

SUMMARY

According to an aspect of the embodiments, there is provided a radio communication apparatus used as one of a plurality of second radio communication apparatus in a radio communication system in which a first radio communication apparatus receives data from the plurality of second radio communication apparatus, the radio communication apparatus including: a detection section which detects a first radio resource that is assigned by the first radio communication apparatus and that can be used on a contention basis by the plurality of second radio communication apparatus for data transmission; and a transmission processing section which selectively performs, at the time of the first radio resource being detected, one of a first transmission method using the first radio resource for data transmission and a second transmission method using a second radio resource assigned by the first radio communication apparatus by which random access is performed for data transmission.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments will now be described in detail with reference to the drawings.

First Embodiment

Figure 1:
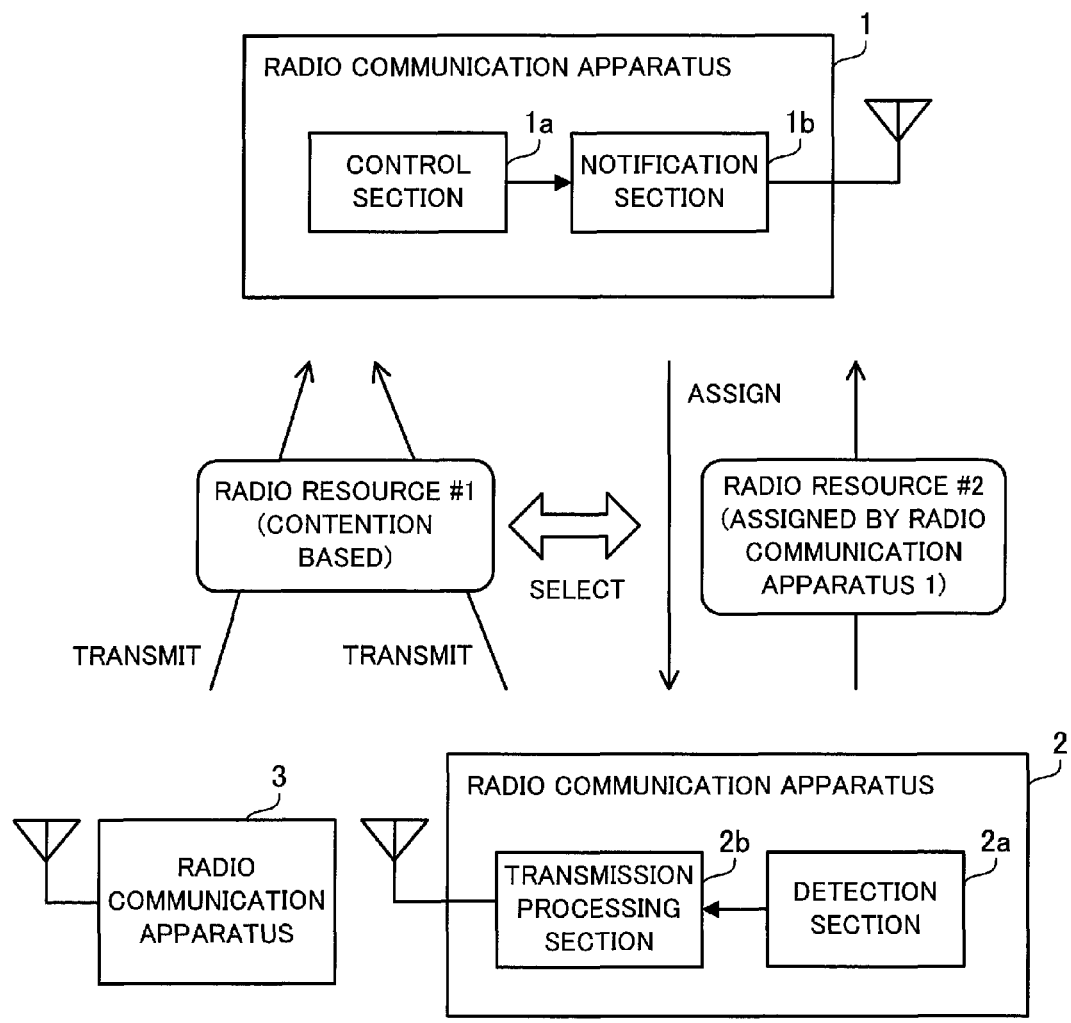
FIG. 1 illustrates a radio communication system according to a first embodiment.

FIG. 1 illustrates a radio communication system according to a first embodiment. A radio communication system according to a first embodiment includes radio communication apparatus 1 through 3. Such a radio communication system can be realized as, for example, an LTE-A system.

The radio communication apparatus 1 controls radio resource assignment. The radio communication apparatus 2 and 3 transmit data to the radio communication apparatus 1 under the control of the radio communication apparatus 1. For example, the radio communication apparatus 1 can be realized as a base station or a relay station and the radio communication apparatus 2 and 3 can be realized as subscriber stations. The radio communication apparatus 1 through 3 may be fixed radio communication apparatus or mobile radio communication apparatus. In the first embodiment it is assumed that the radio communication apparatus 2 and 3 begin data transmission from a state (dormant state, for example) in which radio resources used for data transmission are not assigned individually.

The radio communication apparatus 1 includes a control section 1a and a notification section 1b. The control section 1a configures a radio resource which the radio communication apparatus 2 and 3 can use on a contention basis for data transmission, that is to say, a contention based radio resource. A contention based radio resource may be set in, for example, a constant period. In addition, the control section 1a can assign to the radio communication apparatus 2 and 3 a control channel radio resource used for transmitting a radio resource assignment request. The notification section 1b notifies the radio communication apparatus 2 and 3 of at least one of information indicating the contention based radio resource and information indicating the control channel radio resource.

The radio communication apparatus 2 includes a detection section 2a and a transmission processing section 2b. The detection section 2a detects at least one of the contention based radio resource configured by the radio communication apparatus 1 and the control channel radio resource assigned by the radio communication apparatus 1. For example, on the basis of the information of which the radio communication apparatus 1 notifies the radio communication apparatus 2, the detection section 2a detects these radio resources. The transmission processing section 2b transmits data to the radio communication apparatus 1 according to the state of detection by the detection section 2a. The radio communication apparatus 3 can also be realized by the same structure that is adopted in the radio communication apparatus 2.

Data transmission methods performed by the transmission processing section 2b include a method for performing random access and receiving radio resource assignment (transmission method 1), a method for transmitting an assignment request using a control channel radio resource and receiving radio resource assignment (transmission method 2), and a method for transmitting data using a contention based radio resource (transmission method 3). The transmission processing section 2b does not perform these three transmission methods in parallel but selectively performs one of them.

For example, if a contention based radio resource is detected, then the transmission processing section 2b selectively performs one of the transmission method 1 and the transmission method 3 (that is to say, the transmission processing section 2b does not perform the transmission method 1 and the transmission method 3 in parallel). First the transmission processing section 2b performs only one of them. If a procedure for the transmission method fails, then the transmission processing section 2b may abort the procedure which is being performed, and perform the other transmission method. Which to perform first may be determined in advance. Furthermore, if a control channel radio resource is detected, then the transmission processing section 2b selectively performs one of the transmission method 1 and the transmission method 3.

In addition, if both of a contention based radio resource and a control channel radio resource assigned to the radio communication apparatus 2 by the radio communication apparatus 1, for example, are detected, then the transmission processing section 2b selectively performs one of the transmission method 2 and the transmission method 3. First the transmission processing section 2b performs only one of them. If a procedure for the transmission method fails, then the transmission processing section 2b may abort the procedure which is being performed, and perform the other transmission method. Which to perform first may be determined in advance or be determined according to the type of data to be transmitted. Alternatively, the transmission processing section 2b may selectively perform one of the transmission method 1, the transmission method 2, and the transmission method 3.

In addition, the radio communication apparatus 1 can execute control so that the radio communication apparatus 2 can perform only one of the transmission method 2 and the transmission method 3. For example, if the radio communication apparatus 1 makes the radio communication apparatus 2 perform the transmission method 2, then the radio communication apparatus 1 notifies the radio communication apparatus 2 of a control channel radio resource assigned thereto and does not notify the radio communication apparatus 2 of permission to use a contention based radio resource. On the other hand, if the radio communication apparatus 1 makes the radio communication apparatus 2 perform the transmission method 3, then the radio communication apparatus 1 notifies the radio communication apparatus 2 of permission to use a contention based radio resource, and does not assign a control channel radio resource to the radio communication apparatus 2. If the radio communication apparatus 1 makes the radio communication apparatus 2 determine one of the transmission method 2 and the transmission method 3 to be performed, then the radio communication apparatus 1 notifies the radio communication apparatus 2 of both of a control channel radio resource assigned thereto and permission to use a contention based radio resource.

According to the radio communication system according to the above first embodiment a procedure for data transmission performed in the case of a contention based radio resource being configured can be made efficient. That is to say, it is possible to prevent the radio communication apparatus 2 from performing the above transmission method 1 and transmission method 3 in parallel or from performing the above transmission method 2 and transmission method 3 in parallel. This makes it easy to control data transmission from the radio communication apparatus 2 and 3 to the radio communication apparatus 1. In addition, it is possible to avoid assigning a plurality of radio resources for performing data transmission once. As a result, efficiency in the use of a radio resource can be improved.

In the following second through seventh embodiments a case where the radio communication method in the first embodiment is applied to an LTE-A mobile communication system will be described in further detail. However, the radio communication method in the first embodiment can also be applied to a mobile communication system using a communication scheme other than LTE-A or a fixed radio communication system.

Second Embodiment

Figure 2:
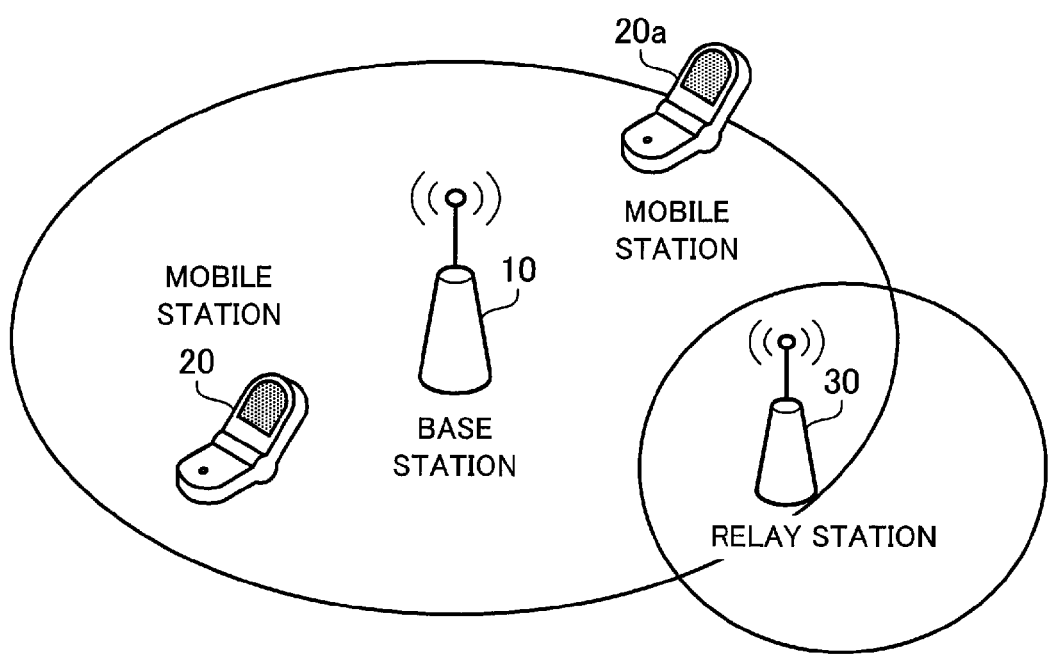
FIG. 2 illustrates a mobile communication system according to a second embodiment.

FIG. 2 illustrates a mobile communication system according to a second embodiment. A mobile communication system according to a second embodiment includes a base station 10, mobile stations 20 and 20a, and a relay station 30.

The base station 10 is a radio communication apparatus which performs communication directly or via the relay station 30 with the mobile stations 20 and 20a. The base station 10 is connected to an upper station (not illustrated) by wire and transfers user data between a wired interval and a radio interval. The base station 10 manages a radio resource for links with the mobile stations 20 and 20a and a radio resource for a link with the relay station 30.

Each of the mobile stations 20 and 20a is a radio terminal device which gains access to the base station 10 or the relay station 30 for performing radio communication. Portable telephones, personal digital assistants, or the like can be used as the mobile stations 20 and 20a. For example, the mobile stations 20 and 20a are in a dormant state in which they do not perform data communication or in an active state in which they can perform data communication. When the mobile station 20 or 20a returns from a dormant state to an active state, it performs one of a random access procedure, a scheduling request procedure, and a contention based uplink access procedure described later.

The relay station 30 is a radio communication apparatus which relays data transmission between the base station 10 and the mobile stations 20 and 20a. The relay station 30 may be a fixed communication apparatus or a mobile communication apparatus. The relay station 30 manages a radio resource for links with the mobile stations 20 and 20a.

In the following description it is assumed that the mobile station 20 transmits data to the base station 10. The same applies to a case where the mobile station 20 transmits data to the relay station 30 or a case where the mobile station 20a transmits data to the base station 10 or the relay station 30.

Figure 3:
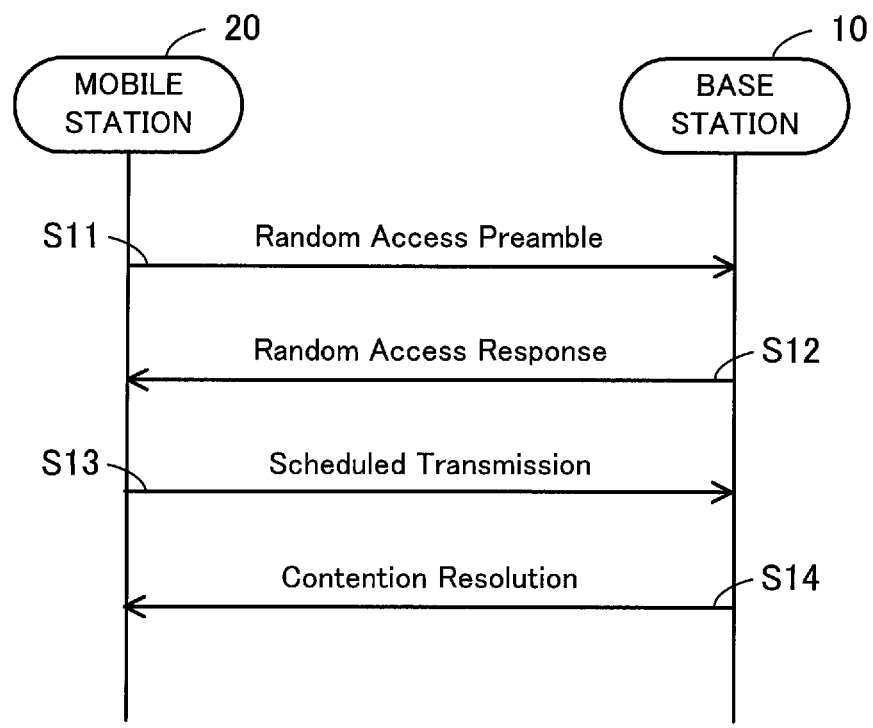
FIG. 3 is a sequence diagram of a random access procedure.

FIG. 3 is a sequence diagram of a random access procedure.

(Step S11) The mobile station 20 selects one of a plurality of signatures defined in advance. The mobile station 20 then transmits a random access preamble using the selected signature to the base station 10 on PRACH (Physical Random Access Channel). At this time a plurality of mobile stations may transmit the same signature at the same timing on the PRACH. That is to say, random access contention may occur.

(Step S12) When the base station 10 detects the random access preamble, the base station 10 transmits a random access response. If contention occurs, then each mobile station which transmits a random access preamble receives a random access response.

(Step S13) When the mobile station 20 receives the random access response, the mobile station 20 transmits to the base station 10 a scheduled transmission including a C-RNTI (Cell Radio Network Temporary Identifier) of the mobile station 20. If contention occurs, then a plurality of mobile stations transmit scheduled transmissions using the same radio resource. In this case, these messages interfere with one another.

(Step S14) The base station 10 receives the scheduled transmission and recognizes from the C-RNTI the mobile station 20 which transmits the scheduled transmission. The base station 10 then transmits to the mobile station 20 a contention resolution which indicates that the base station 10 succeeds in recognizing the mobile station 20. After that, synchronization is established between the base station 10 and the mobile station 20 and data communication can be performed.

If contention occurs, then the base station 10 cannot normally detect a C-RNTI included in a scheduled transmission. In this case, the random access procedure fails. After the mobile station 20 waits for random time, the mobile station 20 returns to step S11 and performs the random access procedure again.

However, the random access procedure may fail repeatedly. In this case, after the mobile station 20 performs the random access procedure a certain number of times or after a certain period of time elapses, the mobile station 20 terminates the random access procedure. More specifically, at least one of a maximum number of times random access is performed and maximum time is set for the mobile station 20. When the number of times random access is performed reaches the maximum number of times or when the maximum time elapses after the first transmission of a random access preamble, the mobile station 20 terminates the random access procedure.

Figure 4:
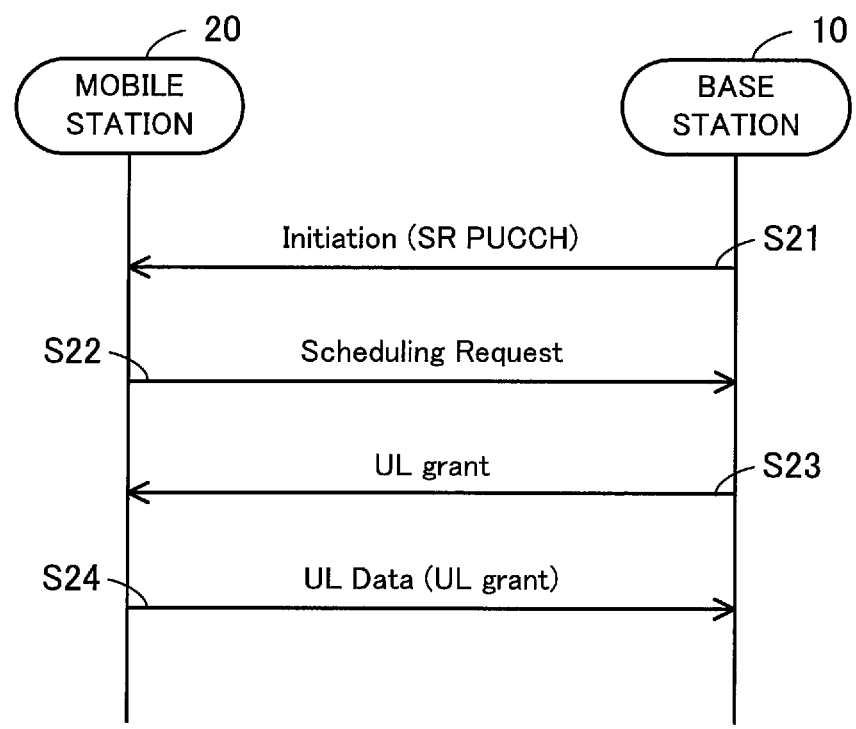
FIG. 4 is a sequence diagram of a scheduling request procedure.

FIG. 4 is a sequence diagram of a scheduling request procedure.

(Step S21) The base station 10 assigns to the mobile station 20 a PUCCH (Physical Uplink control channel) radio resource for transmitting a scheduling request. A PUCCH radio resource is configured in a constant period. The base station 10 then transmits to the mobile station 20 information indicating the radio resource assigned thereto. For example, the base station 10 notifies the mobile station 20 of timing of a subframe and a position in the subframe.

(Step S22) The mobile station 20 uses the radio resource of which it is notified by the base station 10 for transmitting a scheduling request to the base station 10. Scheduling request contention does not occur. However, there is a possibility that the scheduling request procedure fails. The reason for this is that the base station 10 cannot normally receive the scheduling request.

(Step S23) The base station 10 assigns to the mobile station 20 a PUSCH (Physical Uplink Shared Channel) radio resource used for transmitting UL data. The base station 10 then transmits to the mobile station 20 a UL grant indicating the radio resource assigned thereto. If there is a lack of radio resources to be assigned to the mobile station 20, then the scheduling request procedure may fail at this point of time.

(Step S24) The mobile station 20 uses the PUSCH radio resource of which it is notified by the base station 10 for transmitting data to the base station 10. On the other hand, if the scheduling request procedure fails and the mobile station 20 cannot receive a UL grant, then the mobile station 20 uses the radio resource which is configured in the constant period and of which it is notified in step S21 for retransmitting a scheduling request.

However, the scheduling request procedure may fail repeatedly. In this case, after the mobile station 20 makes a scheduling request a certain number of times or after a certain period of time elapses, the mobile station 20 terminates the scheduling request procedure. More specifically, at least one of a maximum number of times a scheduling request is made and maximum time is configured for the mobile station 20. When the number of times a scheduling request is transmitted reaches the maximum number of times or when the maximum time elapses after the first transmission of a scheduling request, the mobile station 20 terminates the scheduling request procedure.

Figure 5:
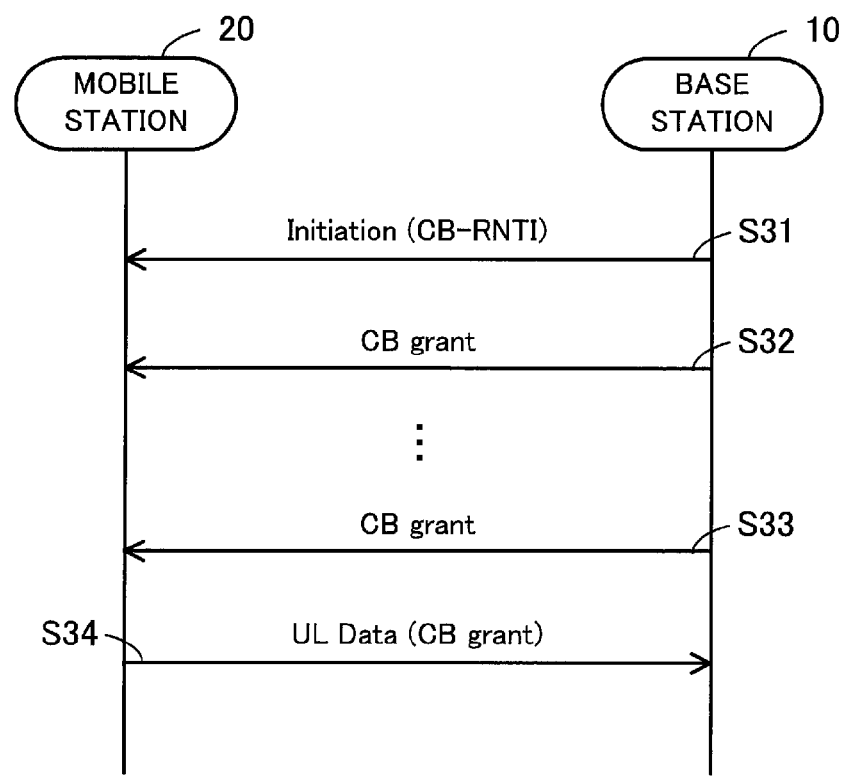
FIG. 5 is a sequence diagram of a contention based uplink access procedure.

FIG. 5 is a sequence diagram of a contention based uplink access procedure.

(Step S31) The base station 10 gives the mobile station 20 a CB-RNTI which is an identifier different from a C-RNTI. The base station 10 then notifies the mobile station 20 of the CB-RNTI. Giving the CB-RNTI means granting permission to perform contention based uplink access. The base station 10 can give a plurality of mobile stations the same CB-RNTI. By increasing or decreasing the number of mobile stations to which the same CB-RNTI is given, the probability of the occurrence of contention can be controlled.

(Step S32) The base station 10 configures a contention based radio resource (CB resource). The base station 10 then transmits to the mobile station 20 a CB grant indicating the configured CB resource. There are various CB resource assignment methods including, for example, a method by which a CB resource is configured in a constant period and a method by which a single CB resource is assigned by a UL grant. In addition, there are various CB grant assignment methods including, for example, a method by which a CB grant is transmitted from the base station 10 to the mobile station 20 in a constant period and a method by which, like a UL grant, a single CB grant is assigned.

(Step S33) The base station 10 transmits the CB grant to the mobile station 20. It is assumed that at this point of time UL transmitted data has been generated in the mobile station 20.

(Step S34) The mobile station 20 uses the CB resource of which it is notified in step S33 by the base station 10 for transmitting the data to the base station 10. However, contention may occur among a plurality of mobile stations. That is to say, a plurality of mobile stations may use the same CB resource for transmitting data. In this case, the mobile station 20 retransmits the data using a subsequent CB resource.

However, data transmission using a CB resource may fail repeatedly. In this case, after the mobile station 20 performs data transmission by a CB resource a certain number of times or after a certain period of time elapses, the mobile station 20 terminates the contention based uplink access procedure. More specifically, at least one of a maximum number of times contention based uplink access is performed and maximum time is configured for the mobile station 20. When the number of times data transmission is performed reaches the maximum number of times or when the maximum time elapses after the first data transmission by a CB resource, the mobile station 20 terminates the contention based uplink access procedure.

Figure 6:
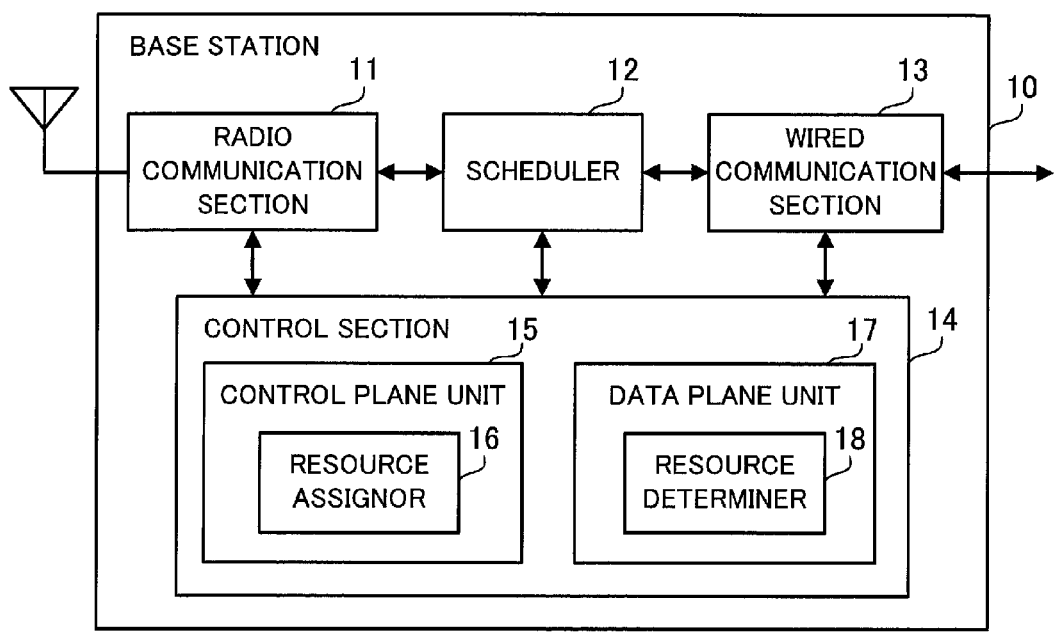
FIG. 6 is a block diagram of a base station.

FIG. 6 is a block diagram of the base station. The base station 10 includes a radio communication section 11, a scheduler 12, a wired communication section 13, a control section 14, a control plane unit 15, a resource assignor 16, a data plane unit 17, and a resource determiner 18.

The radio communication section 11 is a radio interface which performs radio communication with the mobile stations 20 and 20a and the relay station 30. The radio communication section 11 performs signal processing including demodulation and decoding on a radio signal received from the mobile station 20 or 20a or the relay station 30, and extracts user data and control information. In addition, the radio communication section 11 performs signal processing including coding and modulation on user data and control information to be transmitted to the mobile station 20 or 20a or the relay station 30, and radio-transmits them.

In accordance with instructions from the control section 14, the scheduler 12 assigns radio resources to the mobile stations 20 and 20a and the relay station 30 (scheduling). For example, the scheduler 12 assigns a PUCCH or PUSCH radio resource to the mobile station 20 or 20a and sets a CB resource.

The wired communication section 13 is a communication interface which performs wired communication with the upper station. The wired communication section 13 receives from the upper station user data a destination of which is the mobile station 20 or 20a. The received user data is transferred to the mobile station 20 or 20a under scheduling by the scheduler 12. In addition, the wired communication section 13 transfers user data extracted by the radio communication section 11 to the upper station.

The control section 14 controls processing by the radio communication section 11, the scheduler 12, and the wired communication section 13. The control section 14 includes the control plane unit 15 and the data plane unit 17. The control plane unit 15 includes the resource assignor 16. The data plane unit 17 includes the resource determiner 18.

The control plane unit 15 controls transmitting control information to or receiving control information from the mobile stations 20 and 20a and the relay station 30. That is to say, the control plane unit 15 acquires control information extracted by the radio communication section 11, and executes communication control according to the control information. In addition, the control plane unit 15 notifies the radio communication section 11 of control information to be transmitted to the mobile station 20 or 20a or the relay station 30. For example, the control plane unit 15 processes an RRC (Radio Resource Control) protocol.

The resource assignor 16 manages radio resources used by the mobile stations 20 and 20a for accessing the base station 10. For example, the resource assignor 16 determines whether to permit the mobile station 20 or 20a to use a CB resource or whether to assign a PUCCH radio resource to the mobile station 20 or 20a.

The data plane unit 17 controls transmitting user data to or receiving user data from the mobile stations 20 and 20a and the relay station 30. For example, the data plane unit 17 processes a PDCP (Packet Data Convergence Protocol), an RLC (Radio Link Control) protocol, and a MAC (Media Access Control) protocol.

The resource determiner 18 determines a type of a radio resource by which user data that is received from the mobile station 20 or 20a and that is extracted by the radio communication section 11 is received. The resource determiner 18 then determines a process to be performed next according to the determined type of the radio resource.

Figure 7:
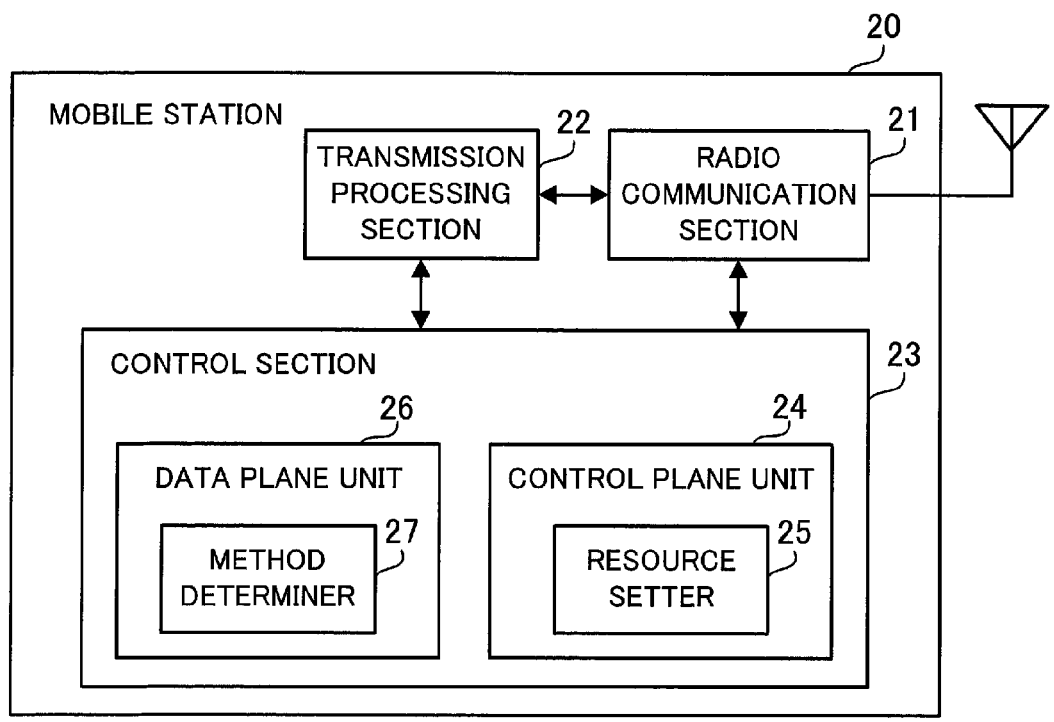
FIG. 7 is a block diagram of a mobile station.

FIG. 7 is a block diagram of the mobile station. The mobile station 20 includes a radio communication section 21, a transmission processing section 22, a control section 23, a control plane unit 24, a resource setter 25, a data plane unit 26, and a method determiner 27.

The radio communication section 21 is a radio interface which performs radio communication with the base station 10 and the relay station 30. The radio communication section 21 performs signal processing including demodulation and decoding on a radio signal received from the base station 10 or the relay station 30, and extracts user data and control information. In addition, the radio communication section 21 performs signal processing including coding and modulation on user data and control information to be transmitted to the base station 10 or the relay station 30, and radio-transmits them.

The transmission processing section 22 uses a UL access method and a radio resource designated by the control section 23 for transmitting data to the base station 10 or the relay station 30. For example, the transmission processing section 22 generates various messages including a random access preamble and a scheduling request, and outputs them to the radio communication section 21.

The control section 23 controls processing by the radio communication section 21 and the transmission processing section 22. The control section 23 includes the control plane unit 24 and the data plane unit 26. The control plane unit 24 includes the resource setter 25. The data plane unit 26 includes the method determiner 27.

The control plane unit 24 controls transmitting control information to or receiving control information from the base station 10 and the relay station 30. That is to say, the control plane unit 24 acquires control information extracted by the radio communication section 21, and executes communication control according to the control information. In addition, the control plane unit 24 notifies the radio communication section 21 of control information to be transmitted to the base station 10 or the relay station 30. For example, the control plane unit 24 processes an RRC protocol.

On the basis of control information received from the base station 10 or the relay station 30, the resource setter 25 manages a UL radio resource which the mobile station 20 can use. When the mobile station 20 transmits data to the base station 10 or the relay station 30, the resource setter 25 notifies the transmission processing section 22 of a UL radio resource.

The data plane unit 26 controls transmitting user data to or receiving user data from the base station 10 and the relay station 30. For example, the data plane unit 26 processes a PDCP, an RLC protocol, and a MAC protocol.

When the mobile station 20 returns from a dormant state to an active state, the method determiner 27 determines which of the random access method, the scheduling request method, and the contention based uplink access method to use. The method determiner 27 then notifies the transmission processing section 22 of the determined method.

The mobile station 20a can also be realized by the same structure that is adopted in the mobile station 20. Like the base station 10, the relay station 30 may include a radio communication section and a control section. In this case, in connection with access to the relay station 30 by the mobile station 20 or 20a, the control section of the relay station 30 performs the same process that the control section 14 of the base station 10 performs.

Figure 8:
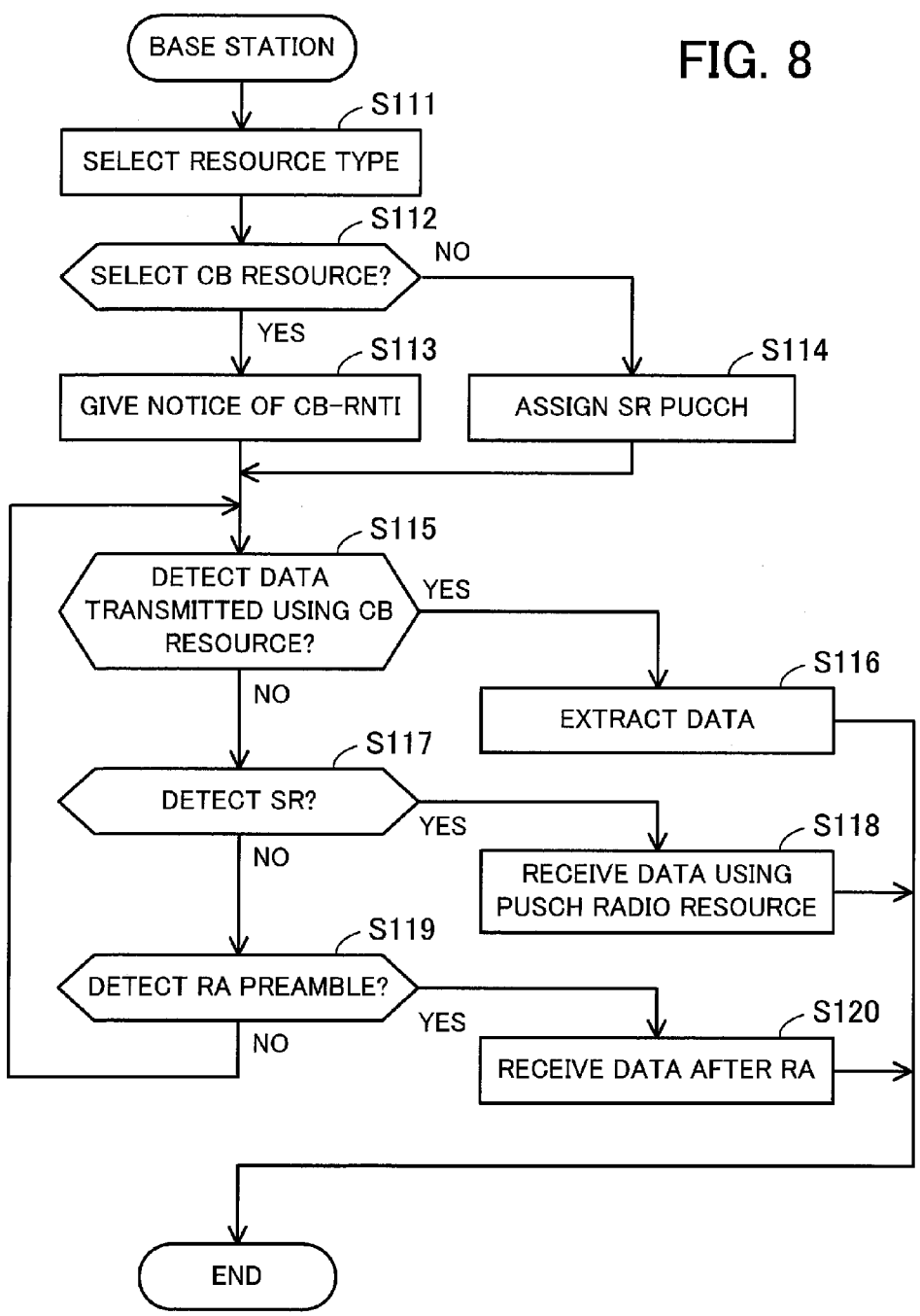
FIG. 8 is a flow chart of a process performed by a base station in the second embodiment.

FIG. 8 is a flow chart of a process performed by the base station in the second embodiment. The process indicated in FIG. 8 will be described in order of step number.

(Step S111) The control section 14 selects only one of a CB resource and a PUCCH radio resource as a radio resource the use of which it permits the mobile station 20. For example, if a PUCCH radio resource is assigned to the mobile station 20, then the control section 14 does not permit the mobile station 20 to use a CB resource. On the other hand, if a PUCCH radio resource is not assigned to the mobile station 20, then the control section 14 permits the mobile station 20 to use a CB resource.

(Step S112) The control section 14 determines whether or not it selects a CB resource in step S111. If the control section 14 selects a CB resource in step S111, then step S113 is performed. If the control section 14 selects a PUCCH radio resource in step S111, then step S114 is performed.

(Step S113) The radio communication section 11 notifies the mobile station 20 of a CB-RNTI. In addition, the radio communication section 11 continuously notifies the mobile station 20 of a CB grant indicating the CB resource. Step S115 is then performed.

(Step S114) The scheduler 112 assigns a PUCCH radio resource to the mobile station 20. The radio communication section 11 notifies the mobile station 20 of the radio resource assigned thereto.

(Step S115) The control section 14 determines whether or not it detects data which the mobile station 20 transmits using the CB resource. If the control section 14 detects data which the mobile station 20 transmits using the CB resource, then step S116 is performed. If the control section 14 does not detect data which the mobile station 20 transmits using the CB resource, then step S117 is performed.

(Step S116) The radio communication section 11 and the wired communication section 13 extract the data detected in step S115, and transfer it to the upper station. The process then terminates.

(Step S117) The control section 14 determines whether or not it detects a scheduling request which the mobile station 20 transmits using the PUCCH radio resource assigned thereto in step S114. If the control section 14 detects a scheduling request which the mobile station 20 transmits using the PUCCH radio resource assigned thereto in step S114, then step S118 is performed. If the control section 14 does not detect a scheduling request which the mobile station 20 transmits using the PUCCH radio resource assigned thereto in step S114, then step S119 is performed.

(Step S118) The scheduler 12 assigns a PUSCH radio resource to the mobile station 20. The radio communication section 11 notifies the mobile station 20 of a UL grant indicating the radio resource assigned thereto. After that, the radio communication section 11 and the wired communication section 13 extract data which the mobile station 20 transmits using the PUSCH radio resource, and transfer it to the upper station. The process then terminates.

(Step S119) The control section 14 determines whether or not it detects a random access preamble which the mobile station 20 transmits on PRACH. If the control section 14 detects a random access preamble which the mobile station 20 transmits on PRACH, then step S120 is performed. If the control section 14 does not detect a random access preamble which the mobile station 20 transmits on PRACH, then step S115 is performed.

(Step S120) The radio communication section 11 performs a random access procedure with the mobile station 20. After that, the radio communication section 11 and the wired communication section 13 extract data which the mobile station 20 transmits, and transfer it to the upper station.

Figure 9:
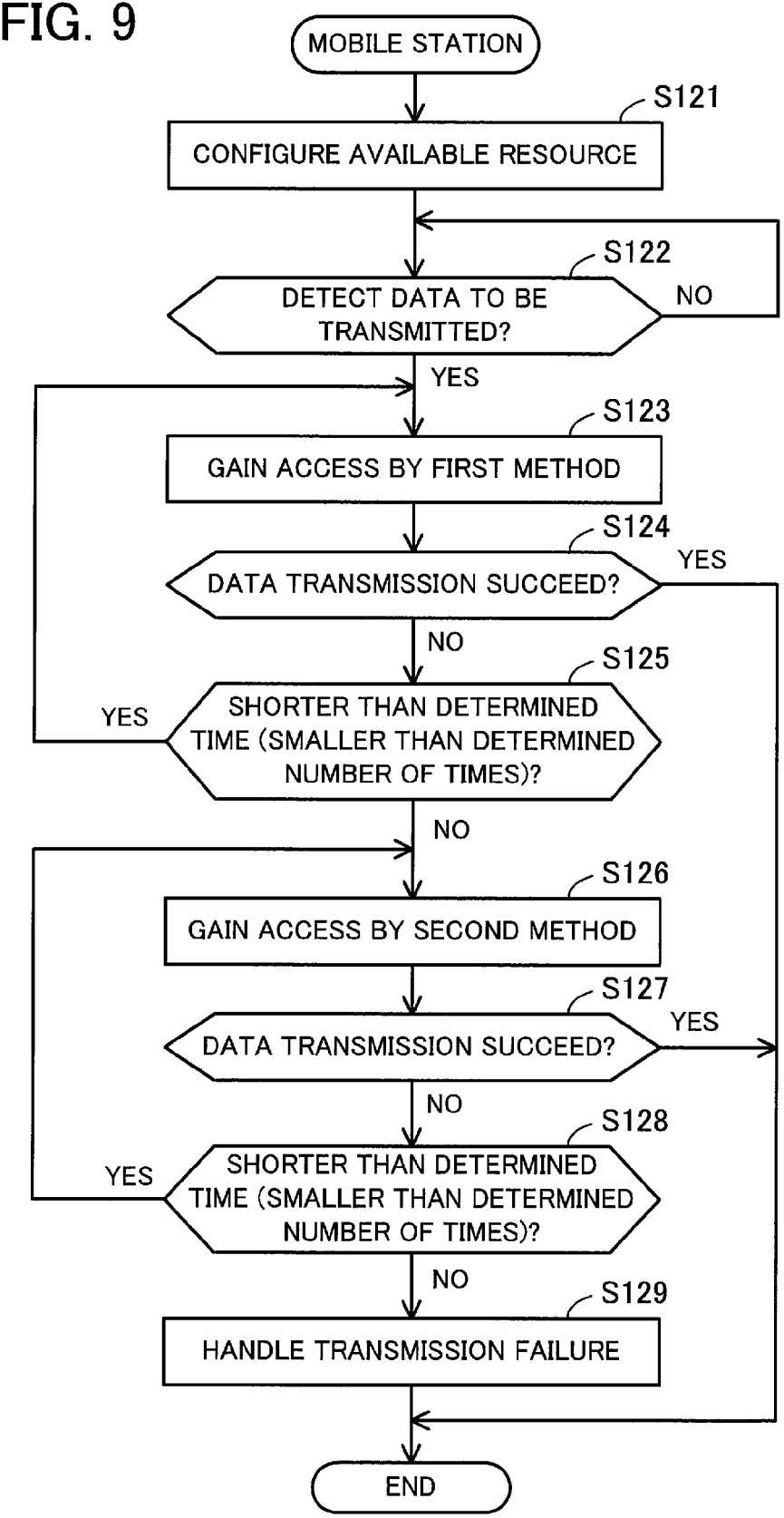
FIG. 9 is a flow chart of a process performed by a mobile station in the second embodiment.

FIG. 9 is a flow chart of a process performed by the mobile station in the second embodiment. The process indicated in FIG. 9 will be described in order of step number.

(Step S121) On the basis of notification from the base station 10, the control section 23 configures an available UL radio resource. More specifically, if the base station 10 notifies the mobile station 20 of a CB-RNTI, then the control section 23 configures a CB resource indicated by a CB grant which the mobile station 20 receives later as an available UL radio resource. If the base station 10 notifies the mobile station 20 of a PUCCH radio resource, then the control section 23 configures it as an available UL radio resource.

(Step S122) The control section 23 determines whether or not it detects data to be transmitted to the base station 10. If the control section 23 detects data to be transmitted to the base station 10, then the control section 23 proceeds to step S123.

If the control section 23 does not detect data to be transmitted to the base station 10, then the control section 23 repeats step S122. That is to say, the control section 23 waits until it detects data to be transmitted to the base station 10.

(Step S123) The control section 23 selects a first method from among the random access method, the scheduling request method, and the contention based uplink access method according to a state in which an available UL radio resource is configured. More specifically, if a CB resource can be used, then the control section 23 selects the random access method or the contention based uplink access method. If a PUCCH radio resource can be used, then the control section 23 selects the random access method or the scheduling request method (preferably the scheduling request method). The transmission processing section 22 performs a procedure for the selected method.

(Step S124) The control section 23 determines whether or not the procedure performed in step S123 succeeds. If the procedure performed in step S123 succeeds, then the control section 23 terminates the process. If the procedure performed in step S123 fails, then the control section 23 proceeds to step S125.

(Step S125) The control section 23 determines whether or not time which elapses after the first beginning of the procedure in step S123 is shorter than determined time (or whether or not the number of times the procedure is performed in step S123 is smaller than a determined number of times). If time which elapses after the first beginning of the procedure in step S123 is shorter than the determined time (or if the number of times the procedure is performed in step S123 is smaller than the determined number of times), then the control section 23 proceeds to step S123. The transmission processing section 22 performs again the procedure for the selected first method. If time which elapses after the first beginning of the procedure in step S123 is not shorter than the determined time (or if the number of times the procedure is performed in step S123 is not smaller than the determined number of times), then the control section 23 proceeds to step S126.

(Step S126) The control section 23 selects a second method which is not selected in step S123 from among the random access method, the scheduling request method, and the contention based uplink access method according to a state in which an available UL radio resource is configured. More specifically, if a CB resource can be used, then the control section 23 selects one of the random access method and the contention based uplink access method which is not yet selected. If a PUCCH radio resource can be used, then the control section 23 selects one of the random access method and the scheduling request method which is not yet selected. The transmission processing section 22 performs a procedure for the selected method.

(Step S127) The control section 23 determines whether or not the procedure performed in step S126 succeeds. If the procedure performed in step S126 succeeds, then the control section 23 terminates the process. If the procedure performed in step S126 fails, then the control section 23 proceeds to step S128.

(Step S128) The control section 23 determines whether or not time which elapses after the first beginning of the procedure in step S126 is shorter than determined time (or whether or not the number of times the procedure is performed in step S126 is smaller than a determined number of times). If time which elapses after the first beginning of the procedure in step S126 is shorter than the determined time (or if the number of times the procedure is performed in step S126 is smaller than the determined number of times), then the control section 23 proceeds to step S126. The transmission processing section 22 performs again the procedure for the selected second method. If time which elapses after the first beginning of the procedure in step S126 is not shorter than the determined time (or if the number of times the procedure is performed in step S126 is not smaller than the determined number of times), then step S129 is performed.

(Step S129) The transmission processing section 22 performs a procedure to be performed at the time of failure in data transmission. For example, the transmission processing section 22 performs a procedure for an RLF (Radio Link Failure) which is a process in an upper layer. The procedure for the RLF is described in, for example, "Evolved Universal Terrestrial Radio Access (E-UTRA) Radio Resource Control (RRC) Protocol specification" (3GPP TS 36.331 V9.1.0, 2009-12).

Figure 10:
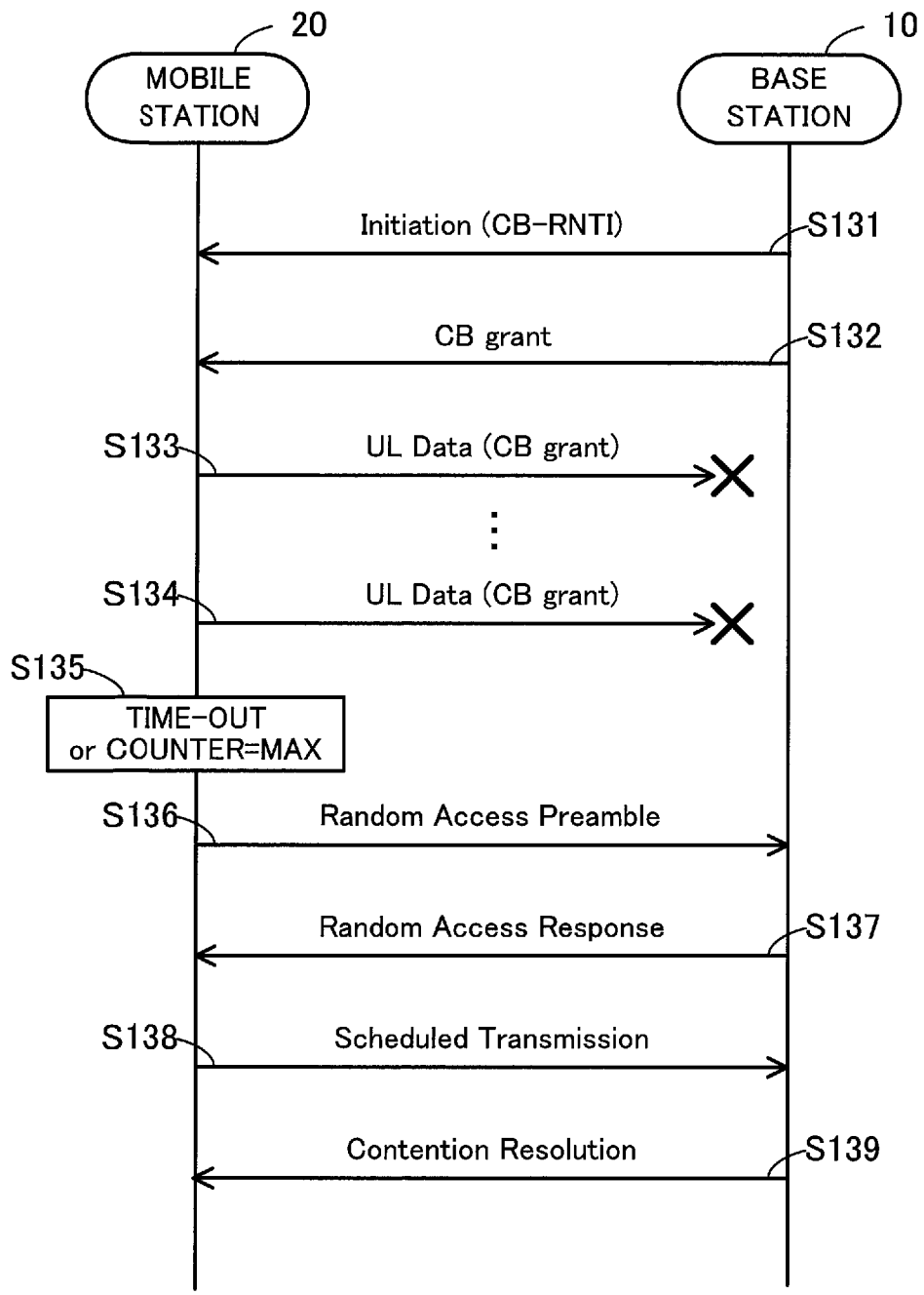
FIG. 10 is a first example of a sequence in the second embodiment.

FIG. 10 is a first example of a sequence in the second embodiment.

(Step S131) The base station 10 notifies the mobile station 20 of a CB-RNTI.

(Step S132) The base station 10 notifies the mobile station 20 of a CB grant.

(Step S133) The mobile station 20 uses a CB resource indicated by the CB grant which the mobile station 20 receives in step S132 for transmitting data to the base station 10. It is assumed that data transmission fails because of the occurrence of contention.

(Step S134) The mobile station 20 uses a CB resource indicated by the latest CB grant which the mobile station 20 receives for retransmitting the data to the base station 10. It is assumed that data transmission fails because of the occurrence of contention.

(Step S135) The mobile station 20 detects that time-out occurs (or a counter reaches its upper limit) in the contention based uplink access method. Then the mobile station 20 terminates a procedure for the contention based uplink access method and performs switching to the random access method. A time-out period (or the upper limit of the counter) is designated in advance by, for example, the base station 10.

(Step S136) The mobile station 20 transmits a random access preamble using a signature selected at random to the base station 10 over PRACH.

(Step S137) The base station 10 returns a random access response.

(Step S138) The mobile station 20 transmits a scheduled transmission to the base station 10.

(Step S139) The base station 10 transmits a contention resolution to the mobile station 20. After that, the mobile station 20 transmits the data to the base station 10.

In the example of a sequence indicated in FIG. 10, as has been described, permission to use the CB resource is granted. In this case, the mobile station 20 preferentially selects the contention based uplink access method and then selects the random access method. If data transmission performed using the CB resource succeeds, this way enhances communication efficiency.

Figure 11:
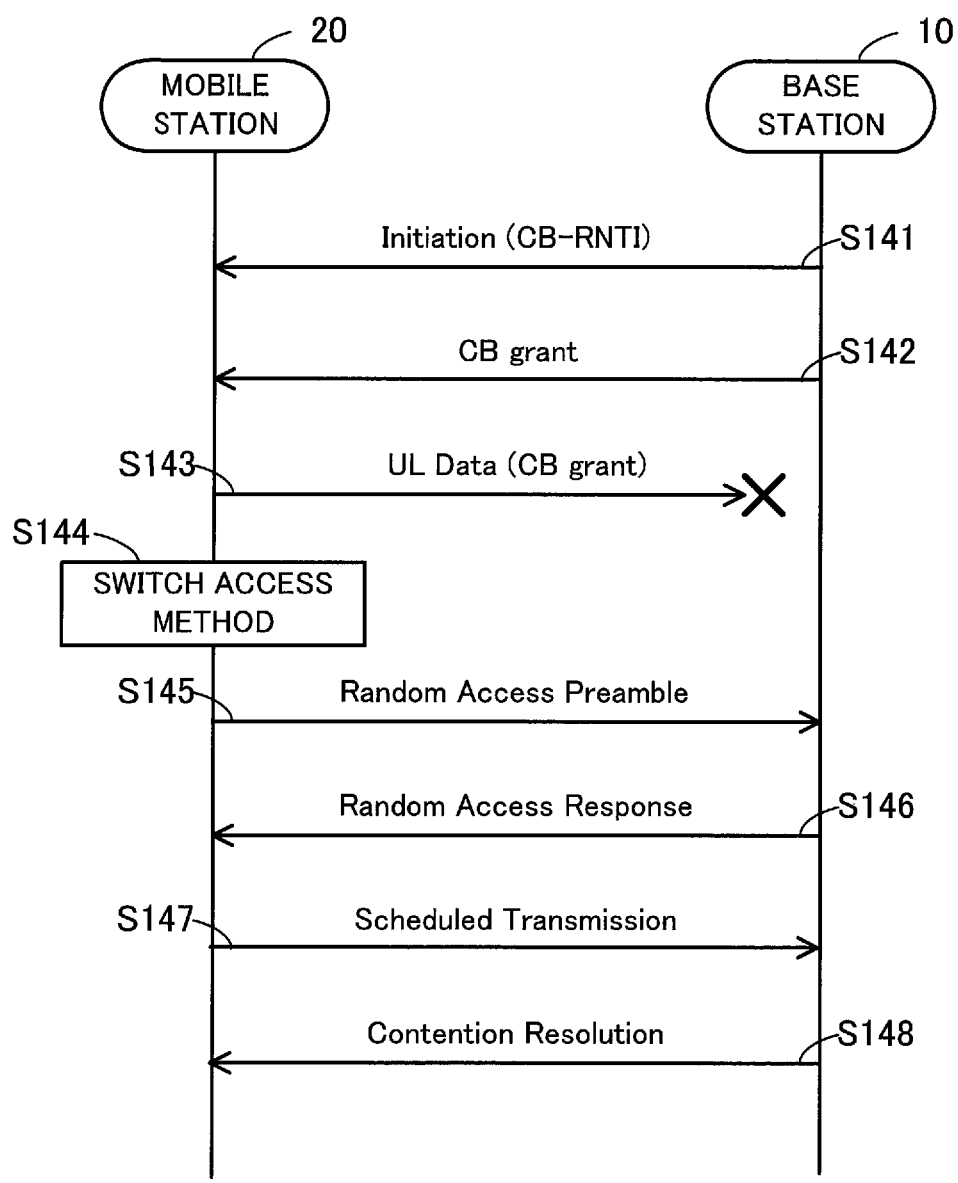
FIG. 11 is a second example of a sequence in the second embodiment.

FIG. 11 is a second example of a sequence in the second embodiment.

(Step S141) The base station 10 notifies the mobile station 20 of a CB-RNTI.

(Step S142) The base station 10 notifies the mobile station 20 of a CB grant.

(Step S143) The mobile station 20 uses a CB resource for transmitting data to the base station 10. It is assumed that data transmission fails because of the occurrence of contention.

(Step S144) Even before time-out occurs (or the counter reaches its upper limit), the mobile station 20 autonomously terminates a procedure for the contention based uplink access method and performs switching to the random access method. If the mobile station 20 performs switching to the random access method, then the mobile station 20 does not perform again the procedure for the contention based uplink access method. In the example of FIG. 11, after transmission fails once, the mobile station 20 performs switching to the random access method. However, after transmission fails a determined number of times (two times, for example) which is smaller than the upper limit of the counter, the mobile station 20 may perform switching to the random access method.

(Step S145) The mobile station 20 transmits a random access preamble to the base station 10.

(Step S146) The base station 10 returns a random access response.

(Step S147) The mobile station 20 transmits a scheduled transmission to the base station 10.

(Step S148) The base station 10 transmits a contention resolution to the mobile station 20. After that, the mobile station 20 transmits data to the base station 10.

In the example of a sequence indicated in FIG. 11, as has been described, the timing at which switching from the contention based uplink access method to the random access method is performed is earlier than the timing at which switching from the contention based uplink access method to the random access method is performed in FIG. 10. Even in a state in which many mobile stations perform UL data transmission and in which the probability of contention is high, this way makes it possible to rapidly cancel an error.

Figure 12:
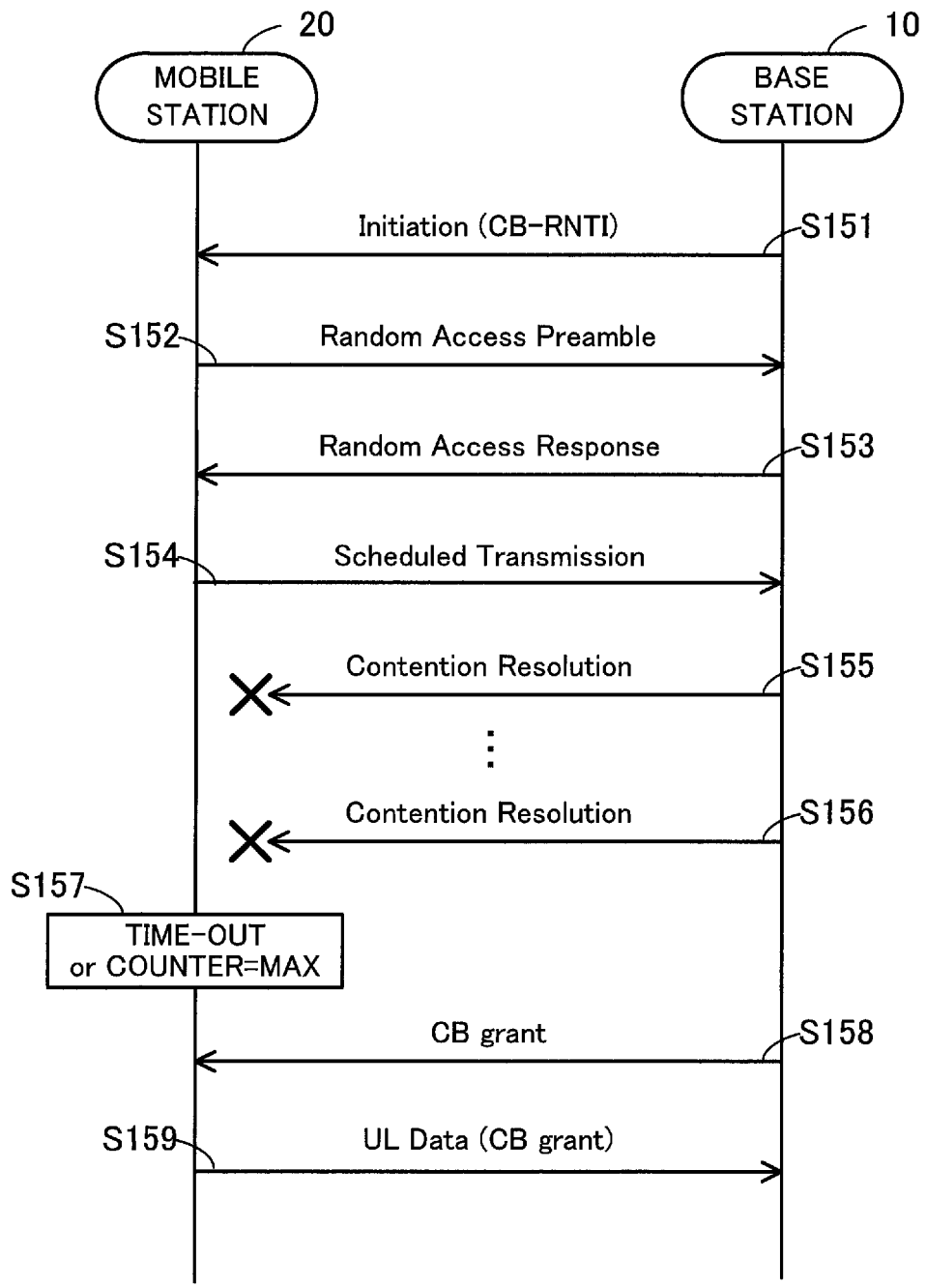
FIG. 12 is a third example of a sequence in the second embodiment.

FIG. 12 is a third example of a sequence in the second embodiment.

(Step S151) The base station 10 notifies the mobile station 20 of a CB-RNTI.

(Step S152) The mobile station 20 transmits a random access preamble to the base station 10. It is assumed that random access contention occurs.

(Step S153) The base station 10 returns a random access response.

(Step S154) The mobile station 20 transmits a scheduled transmission to the base station 10.

(Step S155) The base station 10 cannot detect a C-RNTI of the mobile station 20 because of the occurrence of the contention and fails in transmitting a contention resolution.

(Step S156) The mobile station 20 performs again random access, but random access contention occurs. Accordingly, the base station 10 fails in transmitting a contention resolution.

(Step S157) The mobile station 20 detects that time-out occurs (or the counter reaches its upper limit) in the random access method. Then the mobile station 20 terminates the procedure for the random access method and performs switching to the contention based uplink access method. A time-out period (or the upper limit of the counter) is designated in advance by, for example, the base station 10.

(Step S158) The base station 10 notifies the mobile station 20 of a CB grant.

(Step S159) The mobile station 20 uses a CB resource indicated by the CB grant which the mobile station 20 receives in step S158 for transmitting data to the base station 10.

In the example of a sequence indicated in FIG. 12, as has been described, permission to use the CB resource is granted. In this case, the mobile station 20 preferentially selects the random access method and then selects the contention based uplink access method. Even if the procedure for the random access method fails, this way makes it possible to rapidly cancel an error without performing a process (RLF process, for example) in an upper layer.

Figure 13:
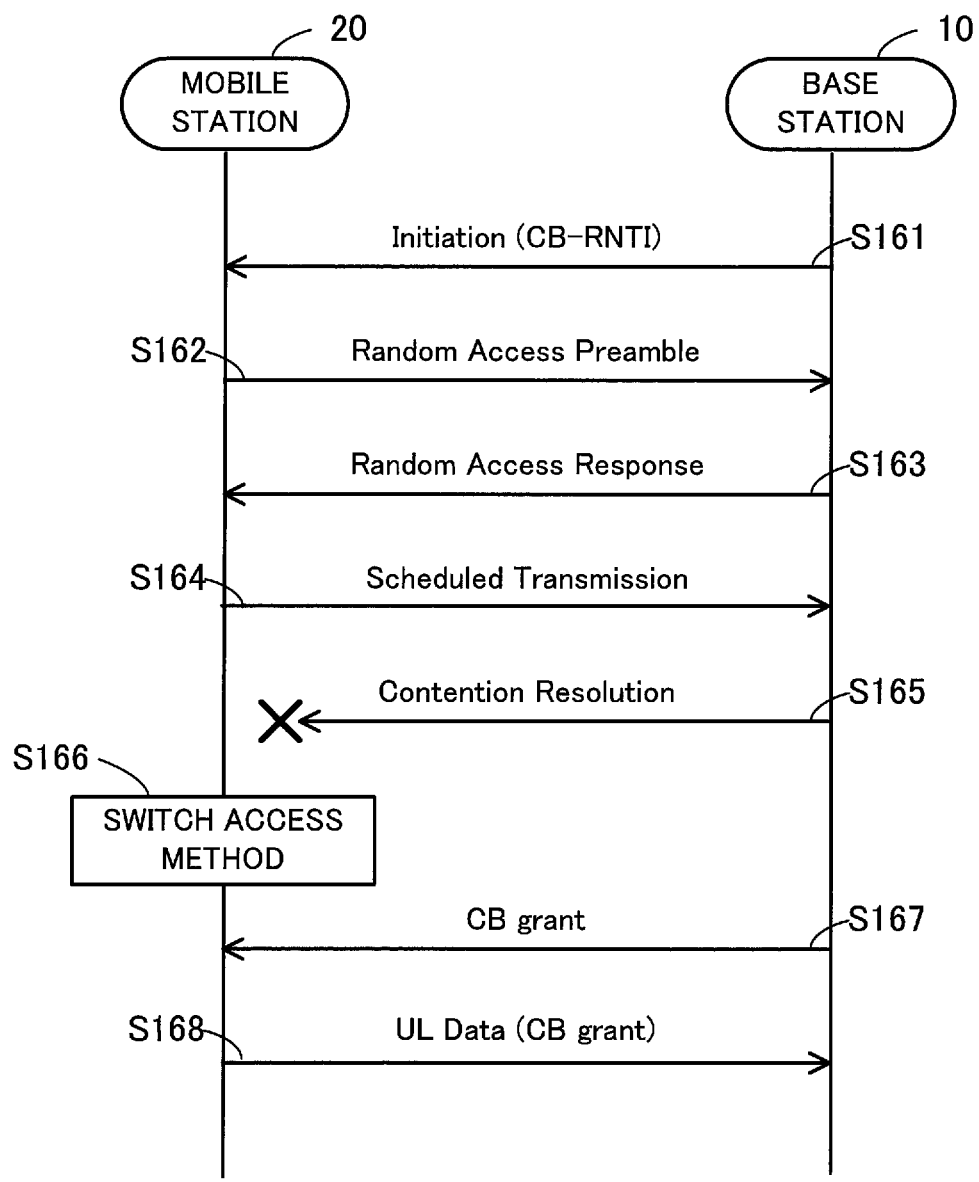
FIG. 13 is a fourth example of a sequence in the second embodiment.

FIG. 13 is a fourth example of a sequence in the second embodiment.

(Step S161) The base station 10 notifies the mobile station 20 of a CB-RNTI.

(Step S162) The mobile station 20 transmits a random access preamble to the base station 10. It is assumed that random access contention occurs.

(Step S163) The base station 10 returns a random access response.

(Step S164) The mobile station 20 transmits a scheduled transmission to the base station 10.

(Step S165) Because of the occurrence of the contention, the base station 10 fails in transmitting a contention resolution.

(Step S166) Even before time-out occurs (or the counter reaches its upper limit), the mobile station 20 autonomously terminates a procedure for the random access method and performs switching to the contention based uplink access method. If the mobile station 20 performs switching to the contention based uplink access method, then the mobile station 20 does not perform again the procedure for the random access method. In the example of FIG. 13, after transmission fails once, the mobile station 20 performs switching to the contention based uplink access method. However, after transmission fails a determined number of times (two times, for example) which is smaller than the upper limit of the counter, the mobile station 20 may perform switching to the contention based uplink access method.

(Step S167) The base station 10 notifies the mobile station 20 of a CB grant.

(Step S168) The mobile station 20 uses a CB resource for transmitting data to the base station 10.

In the example of a sequence indicated in FIG. 13, as has been described, the timing at which switching from the random access method to the contention based uplink access method is performed is earlier than the timing at which switching from the random access method to the contention based uplink access method is performed in FIG. 12. Even in a state in which many mobile stations perform random access and in which the probability of contention is high, this way makes it possible to rapidly cancel an error.

In the above mobile communication system according to the second embodiment the base station 10 can execute control so as to prevent the mobile station 20 or 20a from applying both of the contention based uplink access method and the scheduling request method. In addition, the mobile station 20 or 20a can execute control so as not to apply the random access method and the contention based uplink access method or the random access method and the scheduling request method in parallel. As a result, efficiency in UL data transmission from the mobile station 20 or 20a to the base station 10 is improved.

Third Embodiment

A third embodiment will now be described. The differences between the above second embodiment and a third embodiment will mainly be described and descriptions of the same matters will be omitted. In a mobile communication system according to a third embodiment a mobile station selects the contention based uplink access method or the scheduling request method.

A mobile communication system according to a third embodiment can be realized by adopting the same structure that the mobile communication system according to the second embodiment illustrated in FIG. 2 has. In addition, a base station and a mobile station in a third embodiment can be realized by adopting the same structures that the base station 10 and the mobile station 20 in the second embodiment illustrated in FIGS. 6 and 7, respectively, have. A third embodiment will now be described by the use of the same reference numerals that are used in FIGS. 2, 6, and 7.

Figure 14:
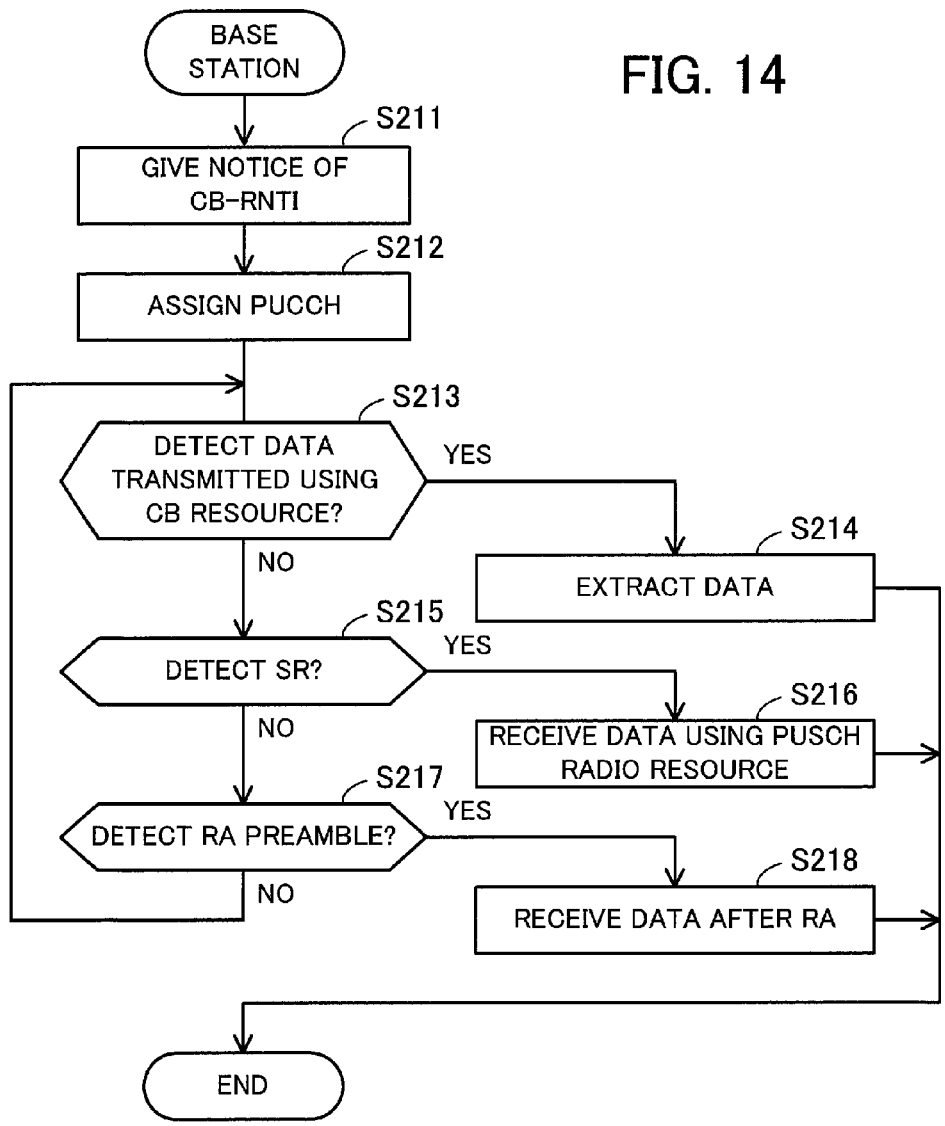
FIG. 14 is a flow chart of a process performed by a base station in a third embodiment.

FIG. 14 is a flow chart of a process performed by a base station in the third embodiment. The process indicated in FIG. 14 will be described in order of step number.

(Step S211) A radio communication section 11 notifies a mobile station 20 of a CB-RNTI. In addition, the radio communication section 11 continuously notifies the mobile station 20 of a CB grant indicating a CB resource.

(Step S212) A scheduler 112 assigns a PUCCH radio resource to the mobile station 20. The radio communication section 11 notifies the mobile station 20 of the radio resource assigned thereto.

(Step S213) A control section 14 determines whether or not it detects data which the mobile station 20 transmits using the CB resource. If the control section 14 detects data which the mobile station 20 transmits using the CB resource, then step S214 is performed. If the control section 14 does not detect data which the mobile station 20 transmits using the CB resource, then step S215 is performed.

(Step S214) The radio communication section 11 and a wired communication section 13 extract the data detected in step S213, and transfer it to an upper station. The process then terminates.

(Step S215) The control section 14 determines whether or not it detects a scheduling request which the mobile station 20 transmits using the PUCCH radio resource assigned thereto in step S212. If the control section 14 detects a scheduling request which the mobile station 20 transmits using the PUCCH radio resource assigned thereto in step S212, then step S216 is performed. If the control section 14 does not detect a scheduling request which the mobile station 20 transmits using the PUCCH radio resource assigned thereto in step S212, then step S217 is performed.

(Step S216) The scheduler 12 assigns a PUSCH radio resource to the mobile station 20. After that, the radio communication section 11 and the wired communication section 13 extract data which the mobile station 20 transmits using the PUSCH radio resource, and transfer it to the upper station. The process then terminates.

(Step S217) The control section 14 determines whether or not it detects a random access preamble which the mobile station 20 transmits on PRACH. If the control section 14 detects a random access preamble which the mobile station 20 transmits on PRACH, then step S218 is performed. If the control section 14 does not detect a random access preamble which the mobile station 20 transmits on PRACH, then step S213 is performed.

(Step S218) The radio communication section 11 performs a random access procedure with the mobile station 20. After that, the radio communication section 11 and the wired communication section 13 extract data which the mobile station 20 transmits, and transfer it to the upper station.

Figure 15:
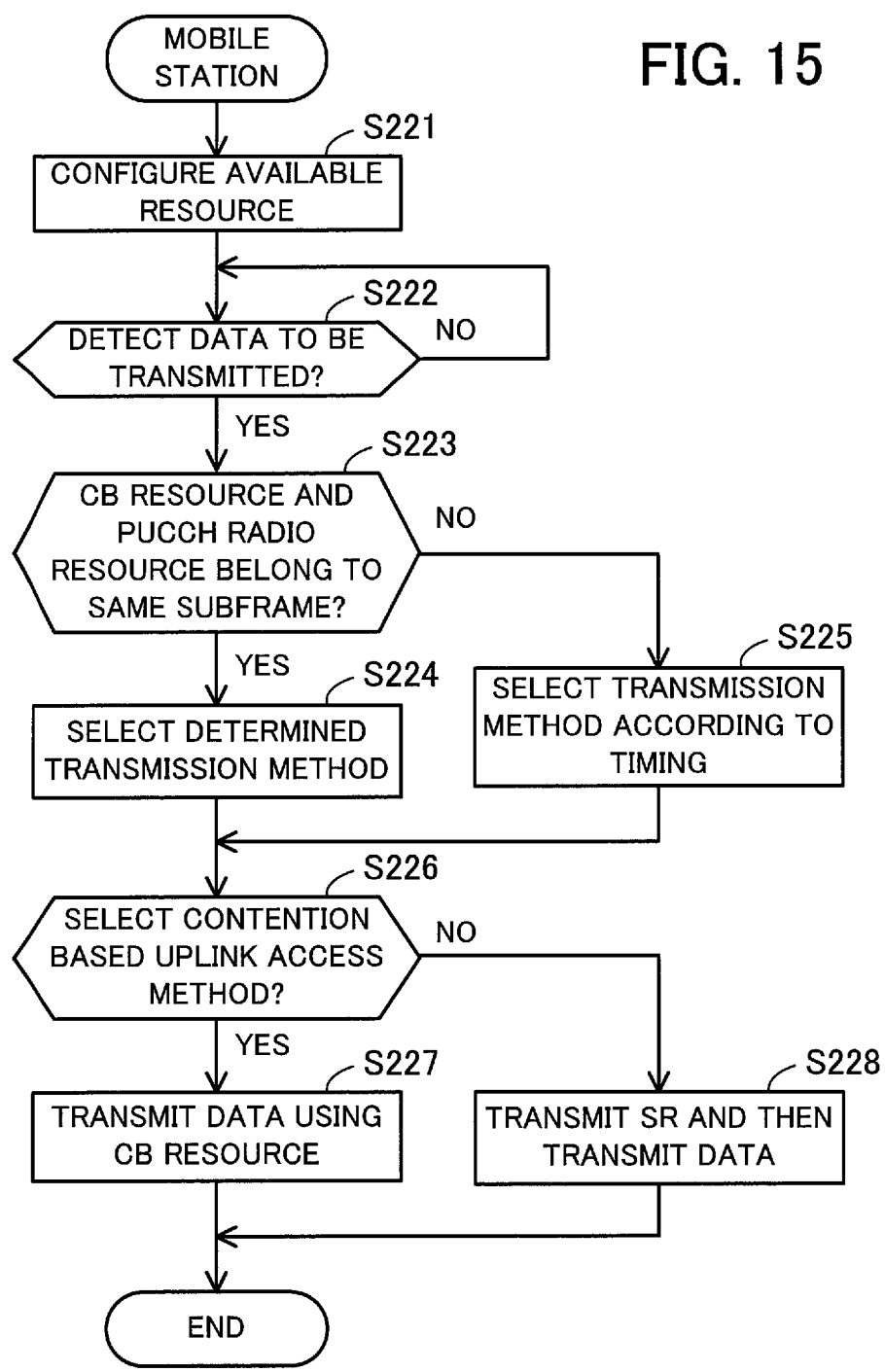
FIG. 15 is a flow chart of a process performed by a mobile station in the third embodiment.

FIG. 15 is a flow chart of a process performed by the mobile station in the third embodiment. The process indicated in FIG. 15 will be described in order of step number.

(Step S221) On the basis of notification from the base station 10, a control section 23 configures an available UL radio resource. More specifically, the control section 23 configures both of a CB resource indicated by a CB grant and a PUCCH radio resource as an available UL radio resource.

(Step S222) The control section 23 determines whether or not it detects data to be transmitted to the base station 10. If the control section 23 detects data to be transmitted to the base station 10, then the control section 23 proceeds to step S223. If the control section 23 does not detect data to be transmitted to the base station 10, then the control section 23 repeats step S222. That is to say, the control section 23 waits until it detects data to be transmitted to the base station 10.

(Step S223) The control section 23 determines whether or not a CB resource and a PUCCH radio resource which can be used next belong to the same subframe. If a CB resource and a PUCCH radio resource which can be used next belong to the same subframe, then the control section 23 proceeds to step S224. If a CB resource and a PUCCH radio resource which can be used next belong to different subframes, then the control section 23 proceeds to step S225.

(Step S224) The control section 23 selects a determined method from the contention based uplink access method and the scheduling request method. After that, the control section 23 proceeds to step S226.

(Step S225) The control section 23 selects one of the contention based uplink access method and the scheduling request method according to the timing of the CB resource and the PUCCH radio resource. For example, the control section 23 selects a method using a radio resource the timing of which is earlier.

(Step S226) The control section 23 determines whether or not it selects the contention based uplink access method. If the control section 23 selects the contention based uplink access method, then step S227 is performed. If the control section 23 does not select the contention based uplink access method, then step S228 is performed.

(Step S227) A transmission processing section 22 performs a procedure for the contention based uplink access method. That is to say, the transmission processing section 22 transmits data to the base station 10 using the CB resource.

(Step S228) The transmission processing section 22 performs a procedure for the scheduling request method. That is to say, the transmission processing section 22 transmits a scheduling request to the base station 10 using the PUCCH radio resource and transmits data to the base station 10 using an assigned PUSCH radio resource.

Figure 16:
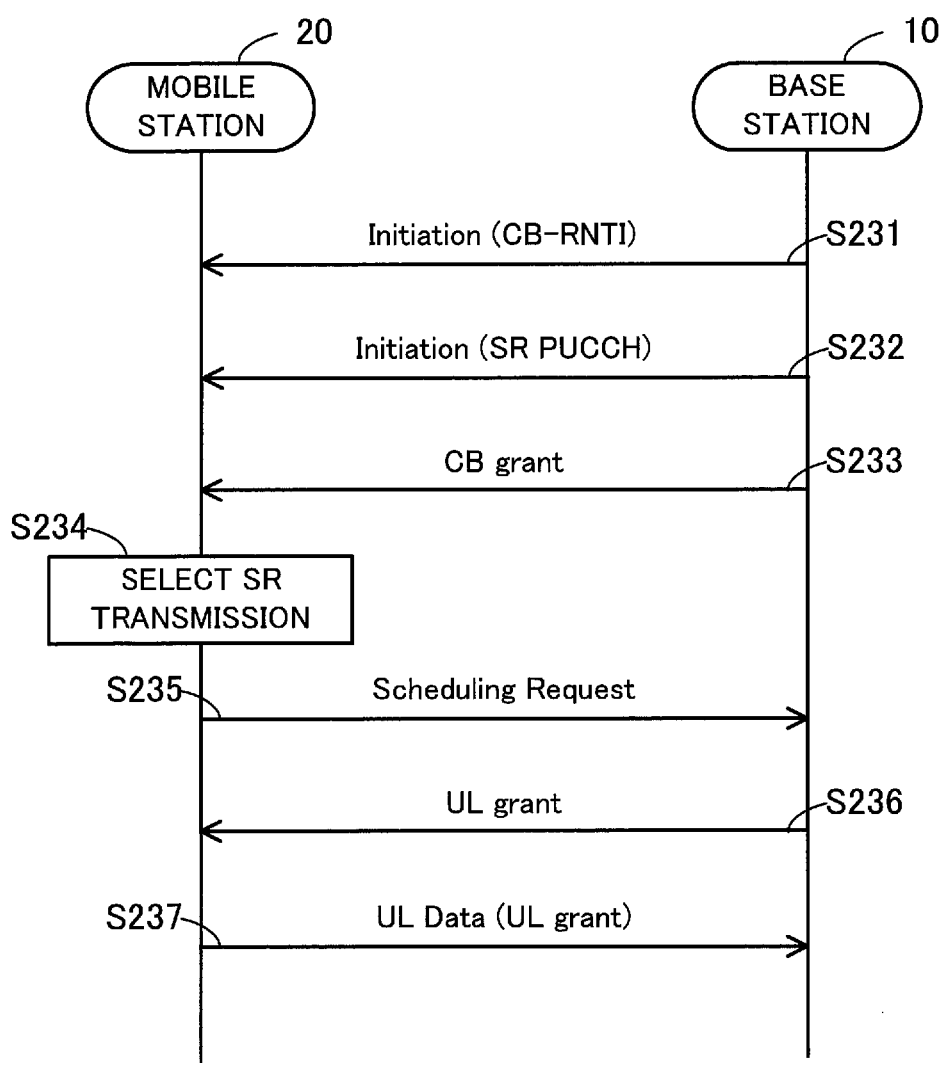
FIG. 16 is a first example of a sequence in the third embodiment.

FIG. 16 is a first example of a sequence in the third embodiment.

(Step S231) The base station 10 notifies the mobile station 20 of a CB-RNTI.

(Step S232) The base station 10 assigns a PUCCH radio resource to the mobile station 20 and notifies the mobile station 20 of the PUCCH radio resource assigned thereto.

(Step S233) The base station 10 notifies the mobile station 20 of a CB grant.

(Step S234) The mobile station 20 selects the scheduling request method.

(Step S235) The mobile station 20 transmits a scheduling request to the base station 10 using the PUCCH radio resource of which the base station 10 notifies the mobile station 20 in step S232.

(Step S236) The base station 10 assigns a PUSCH radio resource to the mobile station 20 and notifies the mobile station 20 of a UL grant.

(Step S237) The mobile station 20 transmits data to the base station 10 using a radio resource indicated by the UL grant of which the base station 10 notifies the mobile station 20.

In the example of a sequence indicated in FIG. 16, as has been described, permission to use a CB resource is granted and the PUCCH radio resource is assigned. In this case, the mobile station 20 preferentially selects the scheduling request method. This way makes it possible to increase the probability by avoiding the occurrence of contention that a data transmission procedure will succeed at the first attempt.

Figure 17:
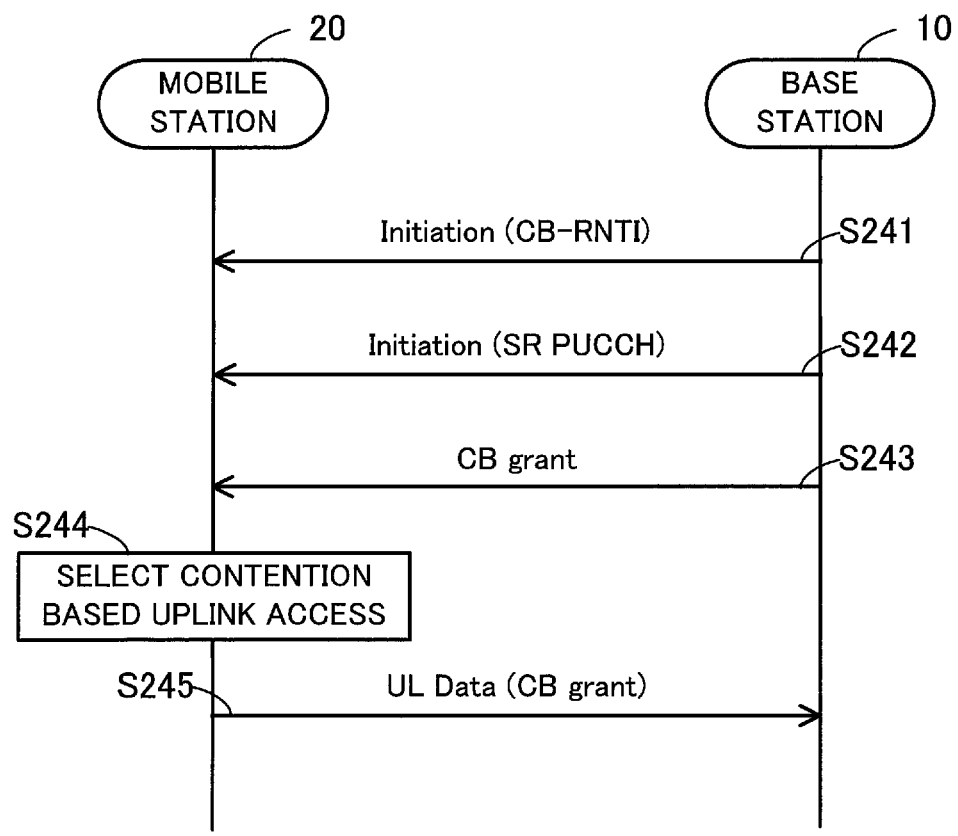
FIG. 17 is a second example of a sequence in the third embodiment.

FIG. 17 is a second example of a sequence in the third embodiment.

(Step S241) The base station 10 notifies the mobile station 20 of a CB-RNTI.

(Step S242) The base station 10 assigns a PUCCH radio resource to the mobile station 20 and notifies the mobile station 20 of the PUCCH radio resource assigned thereto.

(Step S243) The base station 10 notifies the mobile station 20 of a CB grant.

(Step S244) The mobile station 20 selects the contention based uplink access method.

(Step S245) The mobile station 20 transmits data to the base station 10 using a CB resource indicated by the CB grant which the mobile station 20 receives in step S243.

In the example of a sequence indicated in FIG. 17, as has been described, permission to use the CB resource is granted and the PUCCH radio resource is assigned. In this case, the mobile station 20 preferentially selects the contention based uplink access method. If contention does not occur, this way reduces overhead before the beginning of transmission and enhances communication efficiency. From the viewpoint of communication efficiency, it is desirable to select the contention based uplink access method.

In the above mobile communication system according to the third embodiment the mobile station 20 or 20a can execute control so as not to apply the contention based uplink access method and the scheduling request method in parallel. In addition, the mobile station 20 or 20a can select one of the contention based uplink access method and the scheduling request method to be applied. As a result, efficiency in UL data transmission from the mobile station 20 or 20a to the base station 10 is improved.

In the above third embodiment a selection from the scheduling request method and the contention based uplink access method is described. However, a selection from the random access method and the contention based uplink access method can also be controlled in the same way. That is to say, even if both of a PRACH radio resource and a CB resource are included in the same subframe, one of the random access method and the contention based uplink access method can be selected by executing the same control that is described above.

Fourth Embodiment

A fourth embodiment will now be described. The differences between the above second and third embodiments and a fourth embodiment will mainly be described and descriptions of the same matters will be omitted. In a mobile communication system according to a fourth embodiment a mobile station selects one of the contention based uplink access method and the scheduling request method according to the type of data to be transmitted.

A mobile communication system according to a fourth embodiment can be realized by adopting the same structure that the mobile communication system according to the second embodiment illustrated in FIG. 2 has. In addition, a base station and a mobile station in a fourth embodiment can be realized by adopting the same structures that the base station 10 and the mobile station 20 in the second embodiment illustrated in FIGS. 6 and 7, respectively, have. A fourth embodiment will now be described by the use of the same reference numerals that are used in FIGS. 2, 6, and 7.

Figure 18:
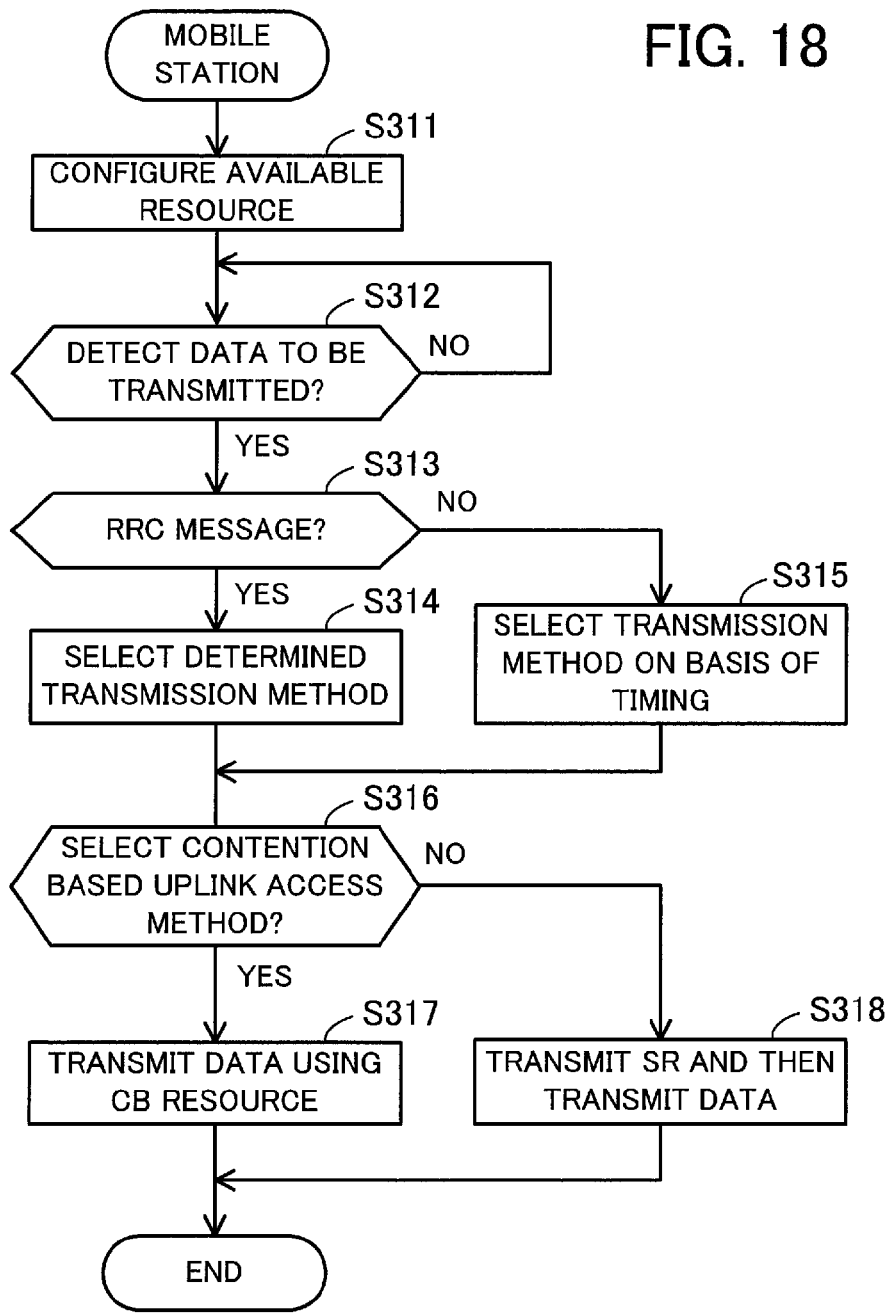
FIG. 18 is a flow chart of a process performed by a mobile station in a fourth embodiment.

FIG. 18 is a flow chart of a process performed by a mobile station in the fourth embodiment. The process indicated in FIG. 18 will be described in order of step number. A process performed by a base station in the fourth embodiment is the same as that indicated in FIG. 14 and performed by the base station in the third embodiment.

(Step S311) On the basis of notification from the base station 10, a control section 23 configures both of a CB resource and a PUCCH radio resource as an available UL radio resource.

(Step S312) The control section 23 determines whether or not it detects data to be transmitted to the base station 10. If the control section 23 detects data to be transmitted to the base station 10, then the control section 23 proceeds to step S313. If the control section 23 does not detect data to be transmitted to the base station 10, then the control section 23 repeats step S312. That is to say, the control section 23 waits until it detects data to be transmitted to the base station 10.

(Step S313) The control section 23 determines whether or not the data detected in step S312 is an RRC message. If the data detected in step S312 is an RRC message, then the control section 23 proceeds to step S314. If the data detected in step S312 is not an RRC message, then the control section 23 proceeds to step S315. An RRC message is an RRC connection reconfiguration request, an RRC connection establishment request, an RRC connection re-establishment request, or the like.

(Step S314) The control section 23 selects a determined method from the contention based uplink access method and the scheduling request method. After that, the control section 23 proceeds to step S316.

(Step S315) The control section 23 selects one of the contention based uplink access method and the scheduling request method on the basis of the timing of the CB resource and the PUCCH radio resource.

(Step S316) The control section 23 determines whether or not it selects the contention based uplink access method. If the control section 23 selects the contention based uplink access method, then step S317 is performed. If the control section 23 does not select the contention based uplink access method, then step S318 is performed.

(Step S317) A transmission processing section 22 performs a procedure for the contention based uplink access method. That is to say, the transmission processing section 22 transmits data to the base station 10 using the CB resource.

(Step S318) The transmission processing section 22 performs a procedure for the scheduling request method. That is to say, the transmission processing section 22 transmits a scheduling request to the base station 10 and then transmits data to the base station 10.

Figure 19:
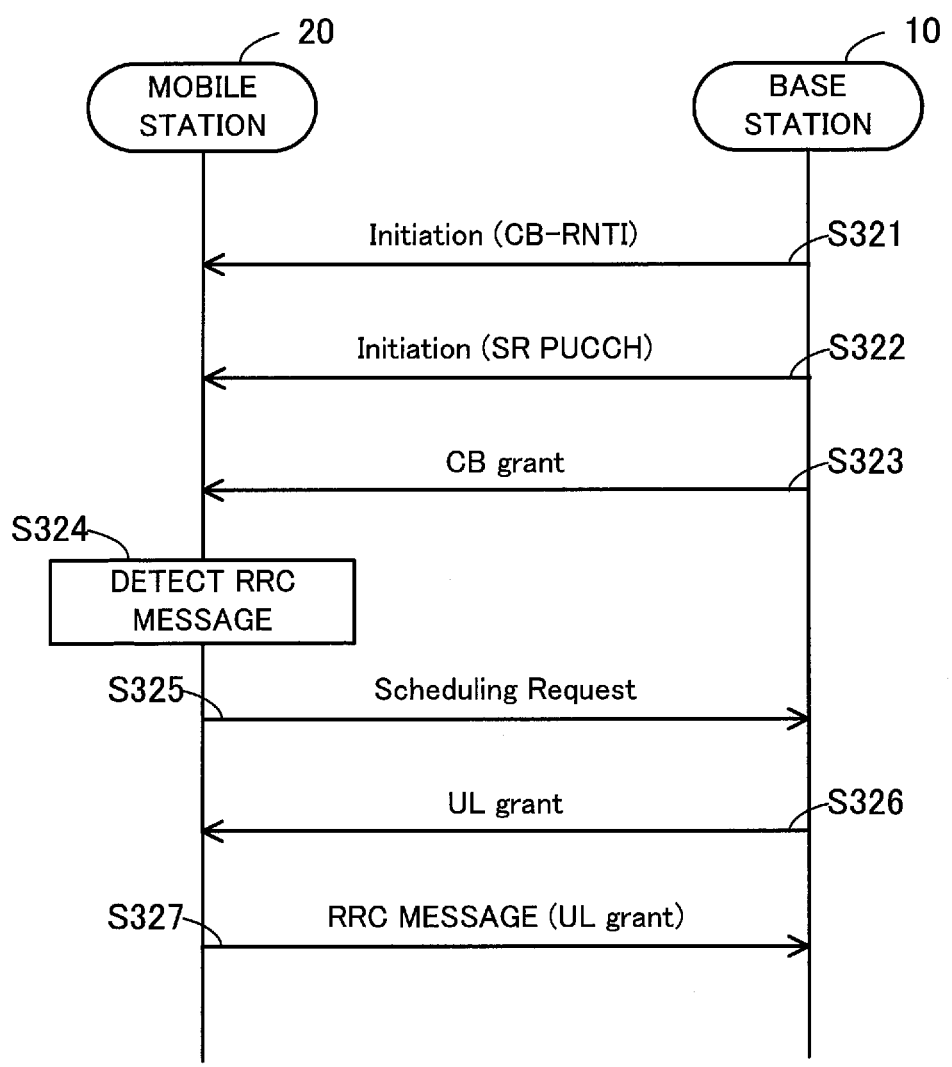
FIG. 19 is a first example of a sequence in the fourth embodiment.

FIG. 19 is a first example of a sequence in the fourth embodiment.

(Step S321) The base station 10 notifies the mobile station 20 of a CB-RNTI.

(Step S322) The base station 10 assigns a PUCCH radio resource to the mobile station 20 and notifies the mobile station 20 of the PUCCH radio resource assigned thereto.

(Step S323) The base station 10 notifies the mobile station 20 of a CB grant.

(Step S324) The mobile station 20 detects an RRC message as data to be transmitted to the base station 10. The mobile station 20 then selects the scheduling request method.

(Step S325) The mobile station 20 transmits a scheduling request to the base station 10 using the PUCCH radio resource of which the base station 10 notifies the mobile station 20 in step S322.

(Step S326) The base station 10 assigns a PUSCH radio resource to the mobile station 20 and notifies the mobile station 20 of a UL grant.

(Step S327) The mobile station 20 transmits the RRC message to the base station 10 using a radio resource indicated by the UL grant of which the base station 10 notifies the mobile station 20.

In the example of a sequence indicated in FIG. 19, as has been described, the mobile station 20 preferentially selects the scheduling request method in the case of transmitting the RRC message.

Figure 20:
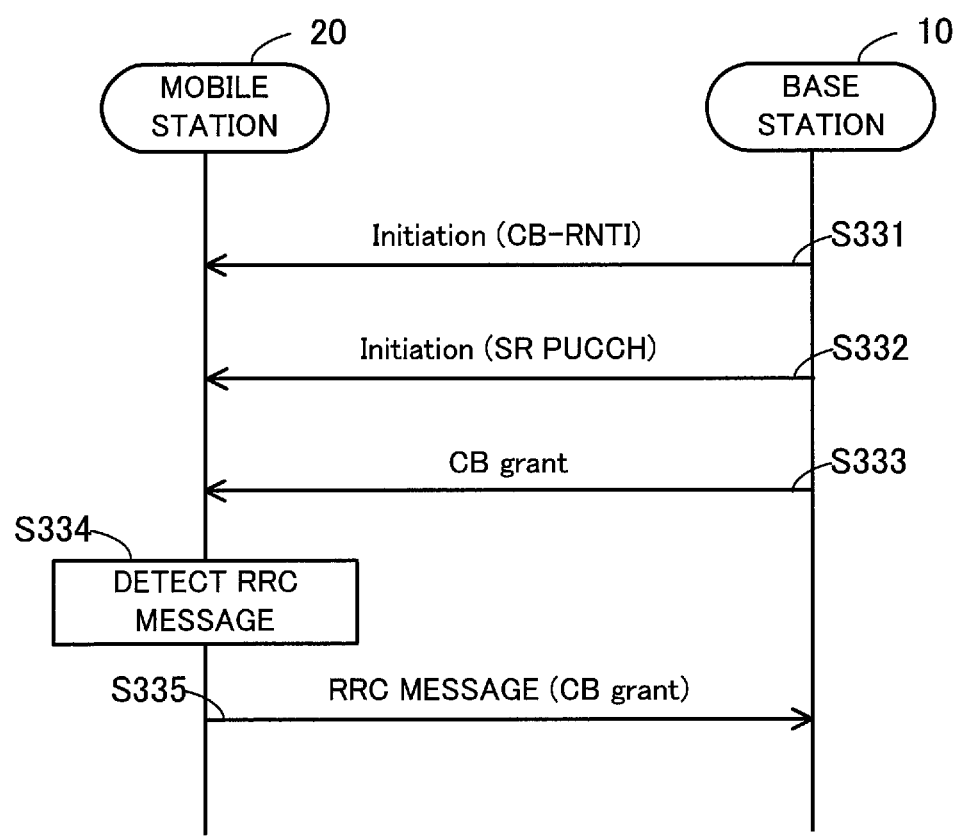
FIG. 20 is a second example of a sequence in the fourth embodiment.

FIG. 20 is a second example of a sequence in the fourth embodiment.

(Step S331) The base station 10 notifies the mobile station 20 of a CB-RNTI.

(Step S332) The base station 10 assigns a PUCCH radio resource to the mobile station 20 and notifies the mobile station 20 of the PUCCH radio resource assigned thereto.

(Step S333) The base station 10 notifies the mobile station 20 of a CB grant.

(Step S334) The mobile station 20 detects an RRC message as data to be transmitted to the base station 10. The mobile station 20 then selects the contention based uplink access method.

(Step S335) The mobile station 20 transmits the data to the base station 10 using a CB resource indicated by the CB grant which the mobile station 20 receives in step S333.

In the example of a sequence indicated in FIG. 20, as has been described, the mobile station 20 preferentially selects the contention based uplink access method in the case of transmitting the RRC message. From the viewpoint of communication efficiency, it is desirable to select the contention based uplink access method.

An RRC message is data of high importance and a communication delay is likely to occur. Accordingly, in FIGS. 18 through 20, an RRC message is distinguished from data of another type to select a UL data transmission method. However, data of a determined type may be distinguished from data of another type in place of an RRC message to select a UL data transmission method.

In the above mobile communication system according to the fourth embodiment the mobile station 20 or 20a can execute control so as not to apply the contention based uplink access method and the scheduling request method in parallel. In addition, the mobile station 20 or 20a can select according to the type of data to be transmitted one of the contention based uplink access method and the scheduling request method to be applied. As a result, efficiency in UL data transmission from the mobile station 20 or 20a to the base station 10 is improved.

In the above fourth embodiment a selection from the scheduling request method and the contention based uplink access method is described. However, a selection from the random access method and the contention based uplink access method can also be controlled in the same way. That is to say, one of the random access method and the contention based uplink access method can be selected according to the type of data to be transmitted by executing the same control that is described above.

Fifth Embodiment

A fifth embodiment will now be described. The differences between the above second through fourth embodiments and a fifth embodiment will mainly be described and descriptions of the same matters will be omitted. In a mobile communication system according to a fifth embodiment the three methods, that is to say, the random access method, the scheduling request method, and the contention based uplink access method are followed directly.

A mobile communication system according to a fifth embodiment can be realized by adopting the same structure that the mobile communication system according to the second embodiment illustrated in FIG. 2 has. In addition, a base station and a mobile station in a fifth embodiment can be realized by adopting the same structures that the base station 10 and the mobile station 20 in the second embodiment illustrated in FIGS. 6 and 7, respectively, have. A fifth embodiment will now be described by the use of the same reference numerals that are used in FIGS. 2, 6, and 7.

Figure 21:
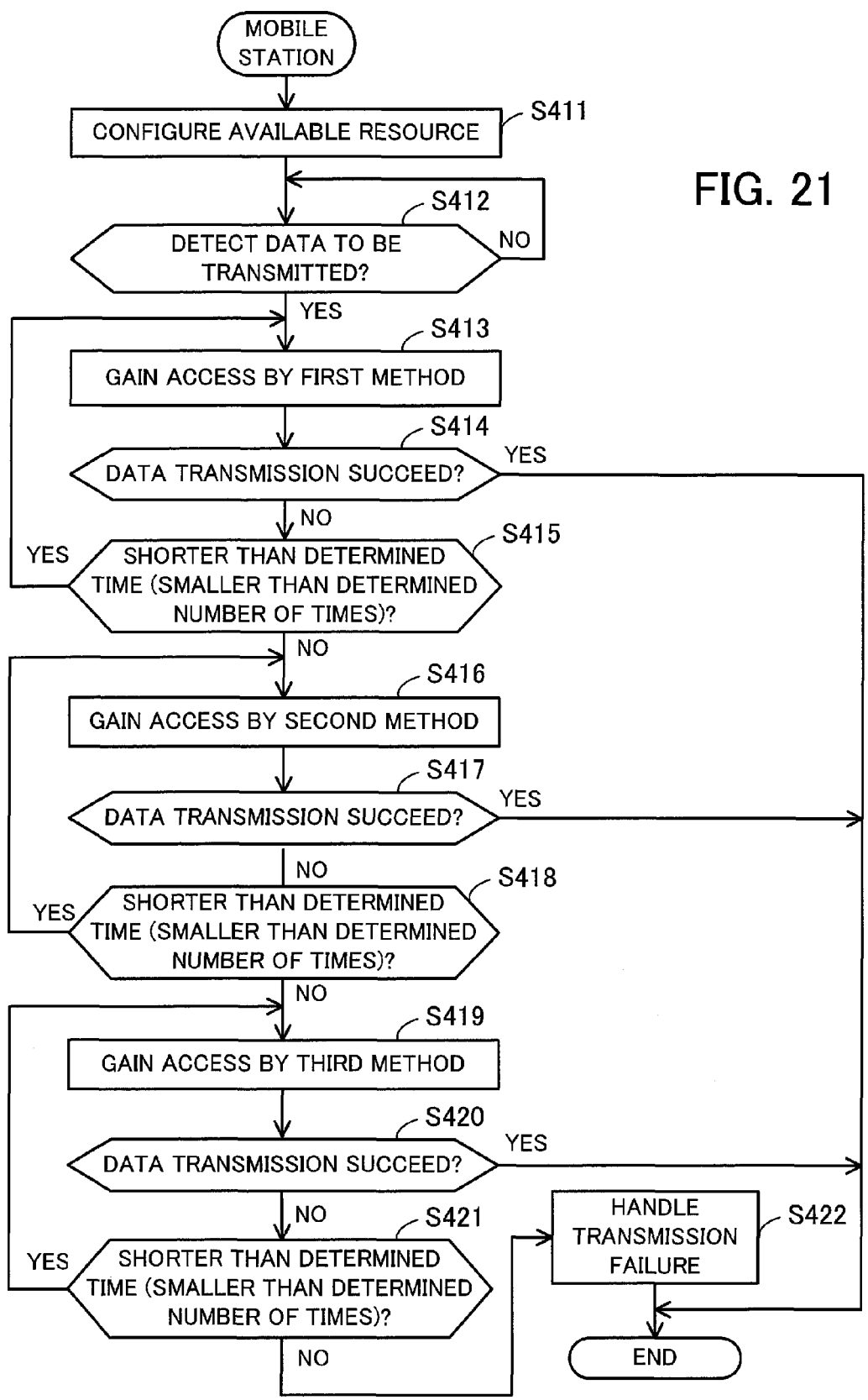
FIG. 21 is a flow chart of a process performed by a mobile station in a fifth embodiment.

FIG. 21 is a flow chart of a process performed by a mobile station in the fifth embodiment. The process indicated in FIG. 21 will be described in order of step number. A process performed by a base station in the fifth embodiment is the same as that indicated in FIG. 14 and performed by the base station in the third embodiment.

(Step S411) On the basis of notification from the base station 10, a control section 23 configures both of a CB resource and a PUCCH radio resource as an available UL radio resource.

(Step S412) The control section 23 determines whether or not it detects data to be transmitted to the base station 10. If the control section 23 detects data to be transmitted to the base station 10, then the control section 23 proceeds to step S413. If the control section 23 does not detect data to be transmitted to the base station 10, then the control section 23 repeats step S412. That is to say, the control section 23 waits until it detects data to be transmitted to the base station 10.

(Step S413) The control section 23 selects a first method from the random access method, the scheduling request method, and the contention based uplink access method. A transmission processing section 22 performs a procedure for the selected method.

(Step S414) The control section 23 determines whether or not the procedure performed in step S413 succeeds. If the procedure performed in step S413 succeeds, then the control section 23 terminates the process. If the procedure performed in step S413 fails, then the control section 23 proceeds to step S415.

(Step S415) The control section 23 determines whether or not time which elapses after the first beginning of the procedure in step S413 is shorter than determined time (or whether or not the number of times the procedure is performed in step S413 is smaller than a determined number of times). If time which elapses after the first beginning of the procedure in step S413 is shorter than the determined time (or if the number of times the procedure is performed in step S413 is smaller than the determined number of times), then the control section 23 proceeds to step S413. The transmission processing section 22 performs again the procedure for the first method. If time which elapses after the first beginning of the procedure in step S413 is not shorter than the determined time (or if the number of times the procedure is performed in step S413 is not smaller than the determined number of times), then the control section 23 terminates the procedure for the first method and proceeds to step S416.

(Step S416) The control section 23 selects a second method which is not yet selected in step S413. The transmission processing section 22 performs a procedure for the selected method.

(Step S417) The control section 23 determines whether or not the procedure performed in step S416 succeeds. If the procedure performed in step S416 succeeds, then the control section 23 terminates the process. If the procedure performed in step S416 fails, then the control section 23 proceeds to step S418.

(Step S418) The control section 23 determines whether or not time which elapses after the first beginning of the procedure in step S416 is shorter than determined time (or whether or not the number of times the procedure is performed in step S416 is smaller than a determined number of times). If time which elapses after the first beginning of the procedure in step S416 is shorter than the determined time (or if the number of times the procedure is performed in step S416 is smaller than the determined number of times), then the control section 23 proceeds to step S416. The transmission processing section 22 performs again the procedure for the second method. If time which elapses after the first beginning of the procedure in step S416 is not shorter than the determined time (or if the number of times the procedure is performed in step S416 is not smaller than the determined number of times), then the control section 23 terminates the procedure for the second method and proceeds to step S419.

(Step S419) The control section 23 selects a third method which is not yet selected. The transmission processing section 22 performs a procedure for the selected method.

(Step S420) The control section 23 determines whether or not the procedure performed in step S419 succeeds. If the procedure performed in step S419 succeeds, then the control section 23 terminates the process. If the procedure performed in step S419 fails, then the control section 23 proceeds to step S421.

(Step S421) The control section 23 determines whether or not time which elapses after the first beginning of the procedure in step S419 is shorter than determined time (or whether or not the number of times the procedure is performed in step S419 is smaller than a determined number of times). If time which elapses after the first beginning of the procedure in step S419 is shorter than the determined time (or if the number of times the procedure is performed in step S419 is smaller than the determined number of times), then the control section 23 proceeds to step S419. The transmission processing section 22 performs again the procedure for the third method. If time which elapses after the first beginning of the procedure in step S419 is not shorter than the determined time (or if the number of times the procedure is performed in step S419 is not smaller than the determined number of times), then the control section 23 terminates the procedure for the third method and step S422 is performed.

(Step S422) The transmission processing section 22 performs a procedure to be performed at the time of failure in data transmission. For example, the transmission processing section 22 performs a procedure for the RLF.

Figure 22:
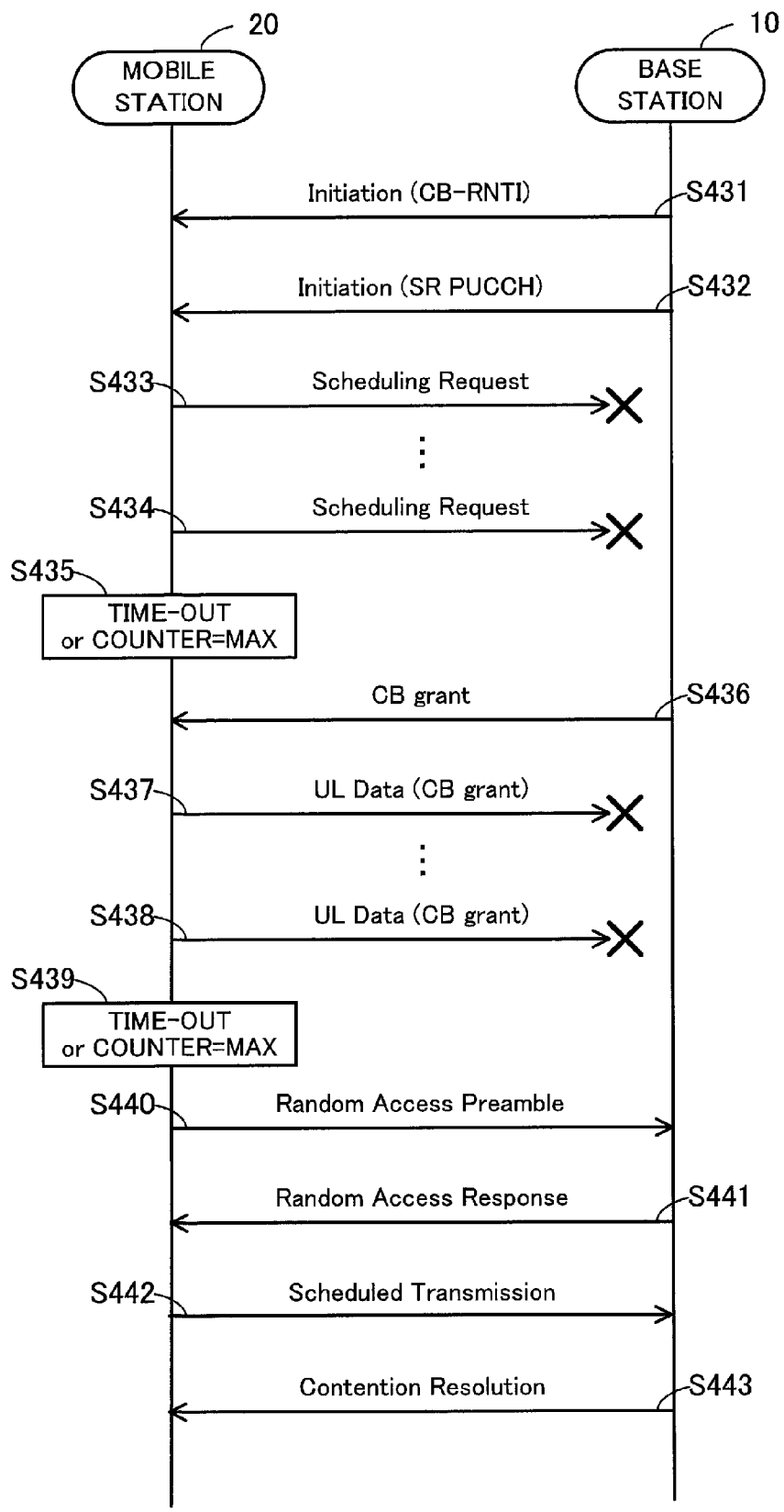
FIG. 22 is a first example of a sequence in the fifth embodiment.

FIG. 22 is a first example of a sequence in the fifth embodiment.

(Step S431) The base station 10 notifies the mobile station 20 of a CB-RNTI.

(Step S432) The base station 10 assigns a PUCCH radio resource to the mobile station 20 and notifies the mobile station 20 of the PUCCH radio resource assigned thereto.

(Step S433) The mobile station 20 transmits a scheduling request to the base station 10 using the PUCCH radio resource. It is assumed that the mobile station 20 fails in transmitting the scheduling request.

(Step S434) The mobile station 20 retransmits a scheduling request to the base station 10 using the next PUCCH radio resource. It is assumed that the mobile station 20 fails in retransmitting the scheduling request.

(Step S435) The mobile station 20 detects that time-out occurs (or the counter reaches its upper limit) in the scheduling request method. Then the mobile station 20 terminates a procedure for the scheduling request method and performs switching to the contention based uplink access method.

(Step S436) The base station 10 notifies the mobile station 20 of a CB grant.

(Step S437) The mobile station 20 transmits data to the base station 10 using a CB resource. It is assumed that the mobile station 20 fails in transmitting the data because of the occurrence of contention.

(Step S438) The mobile station 20 retransmits the data to the base station 10 using the next CB resource. It is assumed that the mobile station 20 fails in retransmitting the data because of the occurrence of contention.

(Step S439) The mobile station 20 detects that time-out occurs (or the counter reaches its upper limit) in the contention based uplink access method. Then the mobile station 20 terminates a procedure for the contention based uplink access method and performs switching to the random access method.

(Step S440) The mobile station 20 transmits a random access preamble to the base station 10 on PRACH.

(Step S441) The base station 10 returns a random access response.

(Step S442) The mobile station 20 transmits a scheduled transmission to the base station 10.

(Step S443) The base station 10 transmits a contention resolution to the mobile station 20. After that, the mobile station 20 transmits the data to the base station 10.

Figure 23:
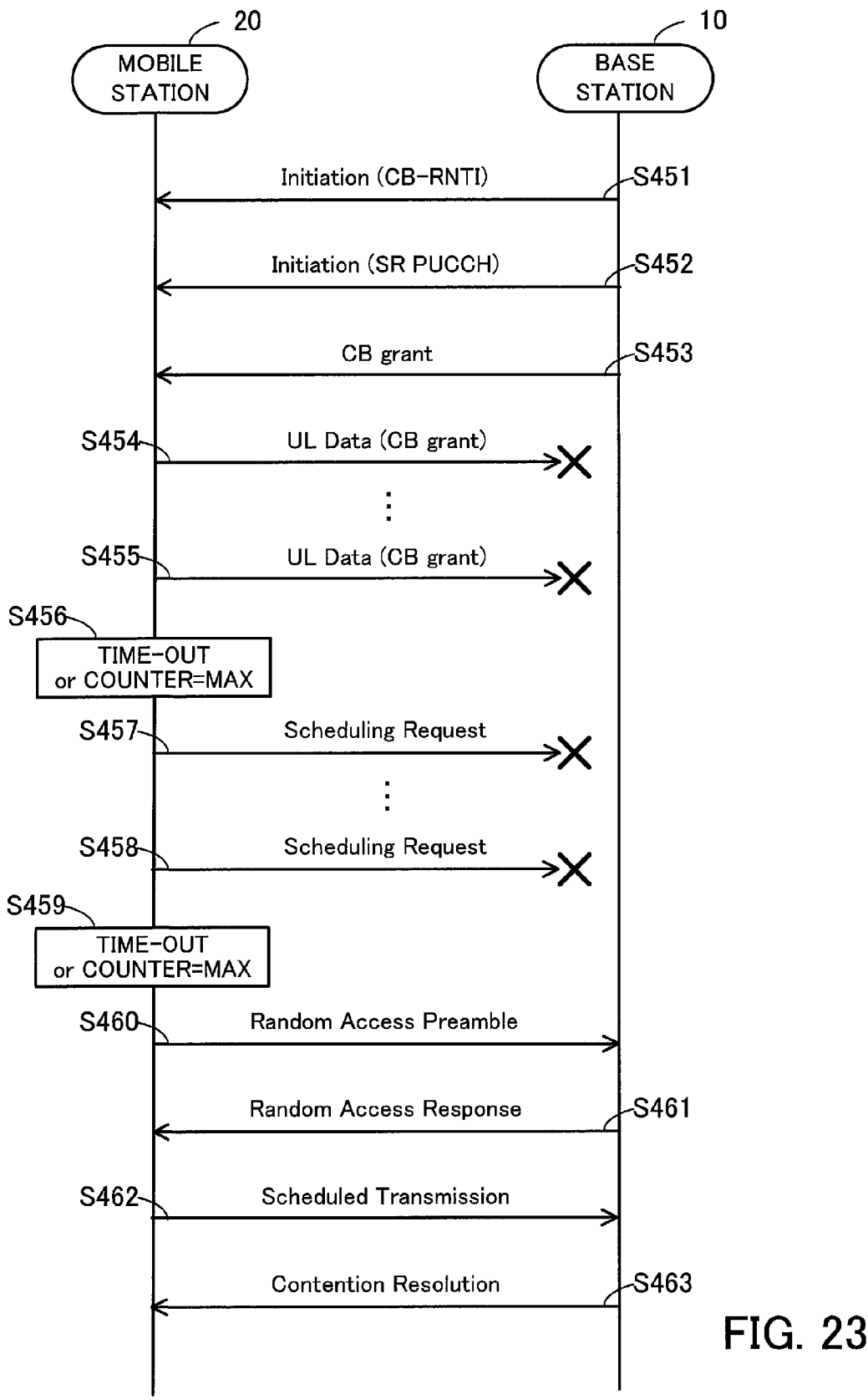
FIG. 23 is a second example of a sequence in the fifth embodiment.

FIG. 23 is a second example of a sequence in the fifth embodiment.

(Step S451) The base station 10 notifies the mobile station 20 of a CB-RNTI.

(Step S452) The base station 10 assigns a PUCCH radio resource to the mobile station 20 and notifies the mobile station 20 of the PUCCH radio resource assigned thereto.

(Step S453) The base station 10 notifies the mobile station 20 of a CB grant.

(Step S454) The mobile station 20 transmits data to the base station 10 using a CB resource. It is assumed that the mobile station 20 fails in transmitting the data because of the occurrence of contention.

(Step S455) The mobile station 20 retransmits the data to the base station 10 using the next CB resource. It is assumed that the mobile station 20 fails in retransmitting the data because of the occurrence of contention.

(Step S456) The mobile station 20 detects that time-out occurs (or the counter reaches its upper limit) in the contention based uplink access method. Then the mobile station 20 terminates a procedure for the contention based uplink access method and performs switching to the scheduling request method.

(Step S457) The mobile station 20 transmits a scheduling request to the base station 10 using the PUCCH radio resource. It is assumed that the mobile station 20 fails in transmitting the scheduling request.

(Step S458) The mobile station 20 retransmits a scheduling request to the base station 10 using the next PUCCH radio resource. It is assumed that the mobile station 20 fails in retransmitting the scheduling request.

(Step S459) The mobile station 20 detects that time-out occurs (or the counter reaches its upper limit) in the scheduling request method. Then the mobile station 20 terminates a procedure for the scheduling request method and performs switching to the random access method.

(Step S460) The mobile station 20 transmits a random access preamble to the base station 10 on PRACH.

(Step S461) The base station 10 returns a random access response.

(Step S462) The mobile station 20 transmits a scheduled transmission to the base station 10.

(Step S463) The base station 10 transmits a contention resolution to the mobile station 20. After that, the mobile station 20 transmits the data to the base station 10.

Figure 24:
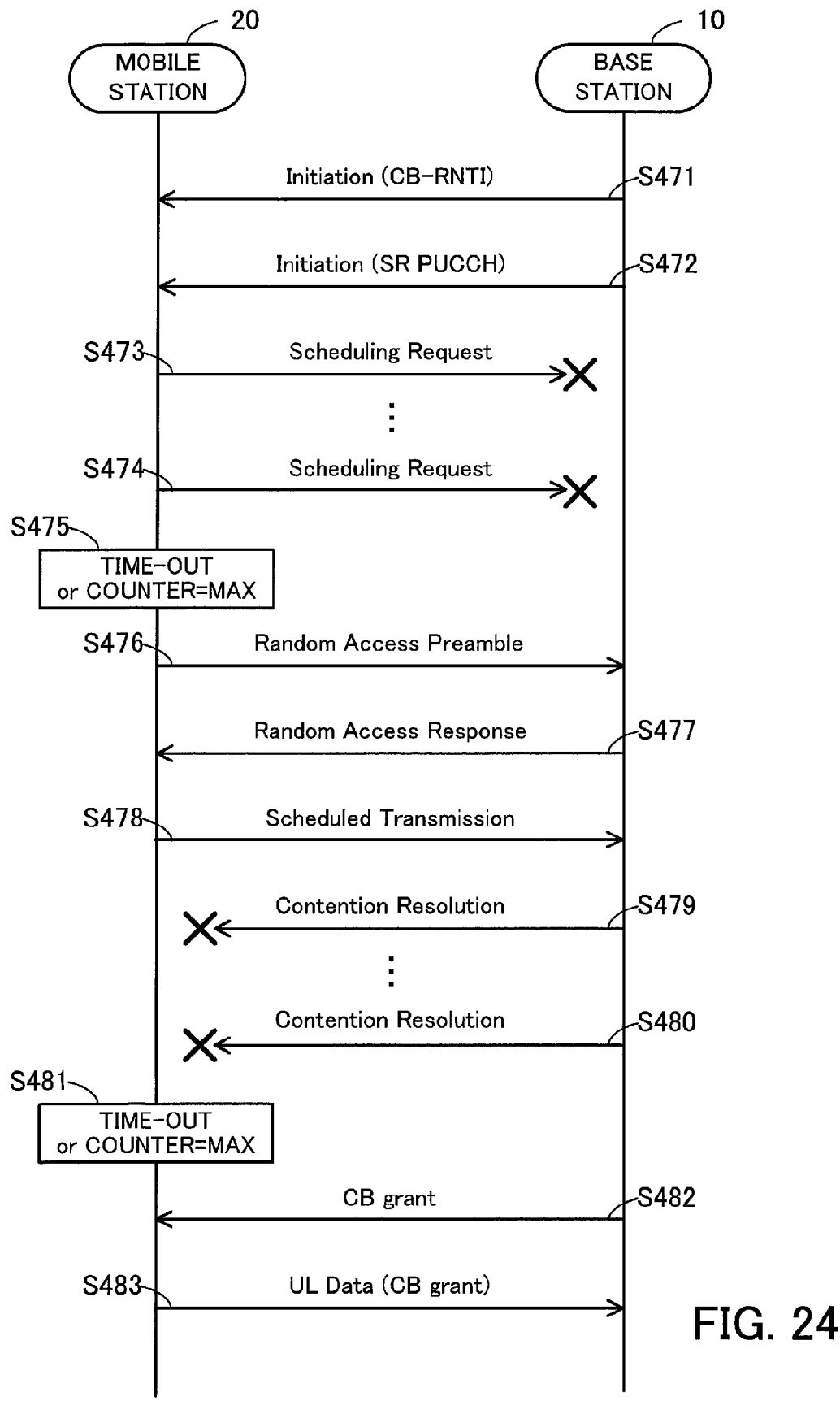
FIG. 24 is a third example of a sequence in the fifth embodiment.

FIG. 24 is a third example of a sequence in the fifth embodiment.

(Step S471) The base station 10 notifies the mobile station 20 of a CB-RNTI.

(Step S472) The base station 10 assigns a PUCCH radio resource to the mobile station 20 and notifies the mobile station 20 of the PUCCH radio resource assigned thereto.

(Step S473) The mobile station 20 transmits a scheduling request to the base station 10 using the PUCCH radio resource. It is assumed that the mobile station 20 fails in transmitting the scheduling request.

(Step S474) The mobile station 20 retransmits a scheduling request to the base station 10 using the next PUCCH radio resource. It is assumed that the mobile station 20 fails in retransmitting the scheduling request.

(Step S475) The mobile station 20 detects that time-out occurs (or the counter reaches its upper limit) in the scheduling request method. Then the mobile station 20 terminates a procedure for the scheduling request method and performs switching to the random access method.

(Step S476) The mobile station 20 transmits a random access preamble to the base station 10 on PRACH. It is assumed that random access contention occurs.

(Step S477) The base station 10 returns a random access response.

(Step S478) The mobile station 20 transmits a scheduled transmission to the base station 10.

(Step S479) The base station 10 cannot detect a C-RNTI of the mobile station 20 because of the occurrence of the contention and fails in transmitting a contention resolution.

(Step S480) The base station 10 performs again random access, but random access contention occurs. Accordingly, the base station 10 fails in transmitting a contention resolution.

(Step S481) The mobile station 20 detects that time-out occurs (or the counter reaches its upper limit) in the random access method. Then the mobile station 20 terminates the procedure for the random access method and performs switching to the contention based uplink access method.

(Step S482) The base station 10 notifies the mobile station 20 of a CB grant.

(Step S483) The mobile station 20 uses a CB resource for transmitting data to the base station 10.

In the above mobile communication system according to the fifth embodiment the mobile station 20 or 20a can execute control so as not to apply the random access method, the scheduling request method, and the contention based uplink access method in parallel. As a result, efficiency in UL data transmission from the mobile station 20 or 20a to the base station 10 is improved. In addition, procedures for a maximum of three methods are performed in series, so the probability of success in data transmission finally increases.

Sixth Embodiment

A sixth embodiment will now be described. The differences between the above second through fifth embodiments and a sixth embodiment will mainly be described and descriptions of the same matters will be omitted. In a mobile communication system according to a sixth embodiment it is assumed that after a procedure for the scheduling request method is begun, a state in which the contention based uplink access method can be applied arises. In this case, the procedure for the scheduling request method is canceled and switching to the contention based uplink access method is performed.

A mobile communication system according to a sixth embodiment can be realized by adopting the same structure that the mobile communication system according to the second embodiment illustrated in FIG. 2 has. In addition, a base station and a mobile station in a sixth embodiment can be realized by adopting the same structures that the base station 10 and the mobile station 20 in the second embodiment illustrated in FIGS. 6 and 7, respectively, have. A sixth embodiment will now be described by the use of the same reference numerals that are used in FIGS. 2, 6, and 7.

Figure 25:
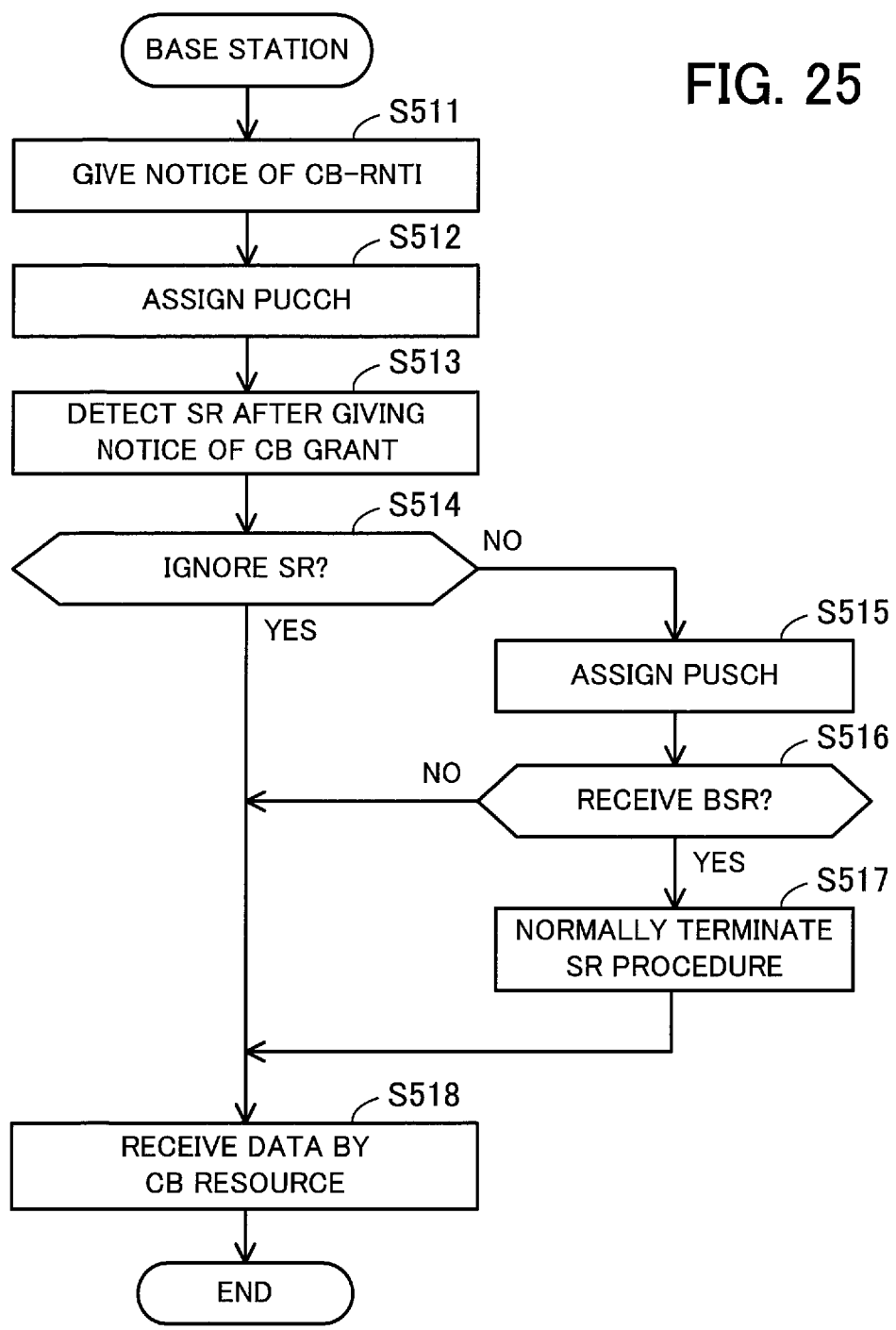
FIG. 25 is a flow chart of a process performed by a base station in a sixth embodiment.

FIG. 25 is a flow chart of a process performed by a base station in the sixth embodiment. The process indicated in FIG. 25 will be described in order of step number.

(Step S511) A radio communication section 11 notifies a mobile station 20 of a CB-RNTI.

(Step S512) A scheduler 112 assigns a PUCCH radio resource to the mobile station 20. The radio communication section 11 notifies the mobile station 20 of the radio resource assigned thereto.

(Step S513) The radio communication section 11 notifies the mobile station 20 of a CB grant. Right (in a determined period of time, for example) after that, the radio communication section 11 receives a scheduling request from the mobile station 20.

(Step S514) A control section 14 determines whether or not it ignores the scheduling request received in step S513 (whether or not setting is configured so as to ignore the scheduling request received in step S513). If the control section 14 ignores the scheduling request received in step S513, then the control section 14 does not respond to the scheduling request and step S518 is performed. If the control section 14 does not ignore the scheduling request received in step S513, then step S515 is performed.

(Step S515) The scheduler 12 assigns a PUSCH radio resource to the mobile station 20. The radio communication section 11 notifies the mobile station 20 of the radio resource assigned thereto.

(Step S516) The control section 14 determines whether or not a BSR (Buffer Status Report) is received by the radio resource assigned in step S515. If a BSR is received by the radio resource assigned in step S515, then step S517 is performed. If a BSR is not received by the radio resource assigned in step S515, then step S518 is performed.

(Step S517) The control section 14 normally terminates the procedure for the scheduling request method.

(Step S518) The radio communication section 11 and a wired communication section 13 extract data which the mobile station 20 transmits using a CB resource, and transfer it to an upper station.

Figure 26:
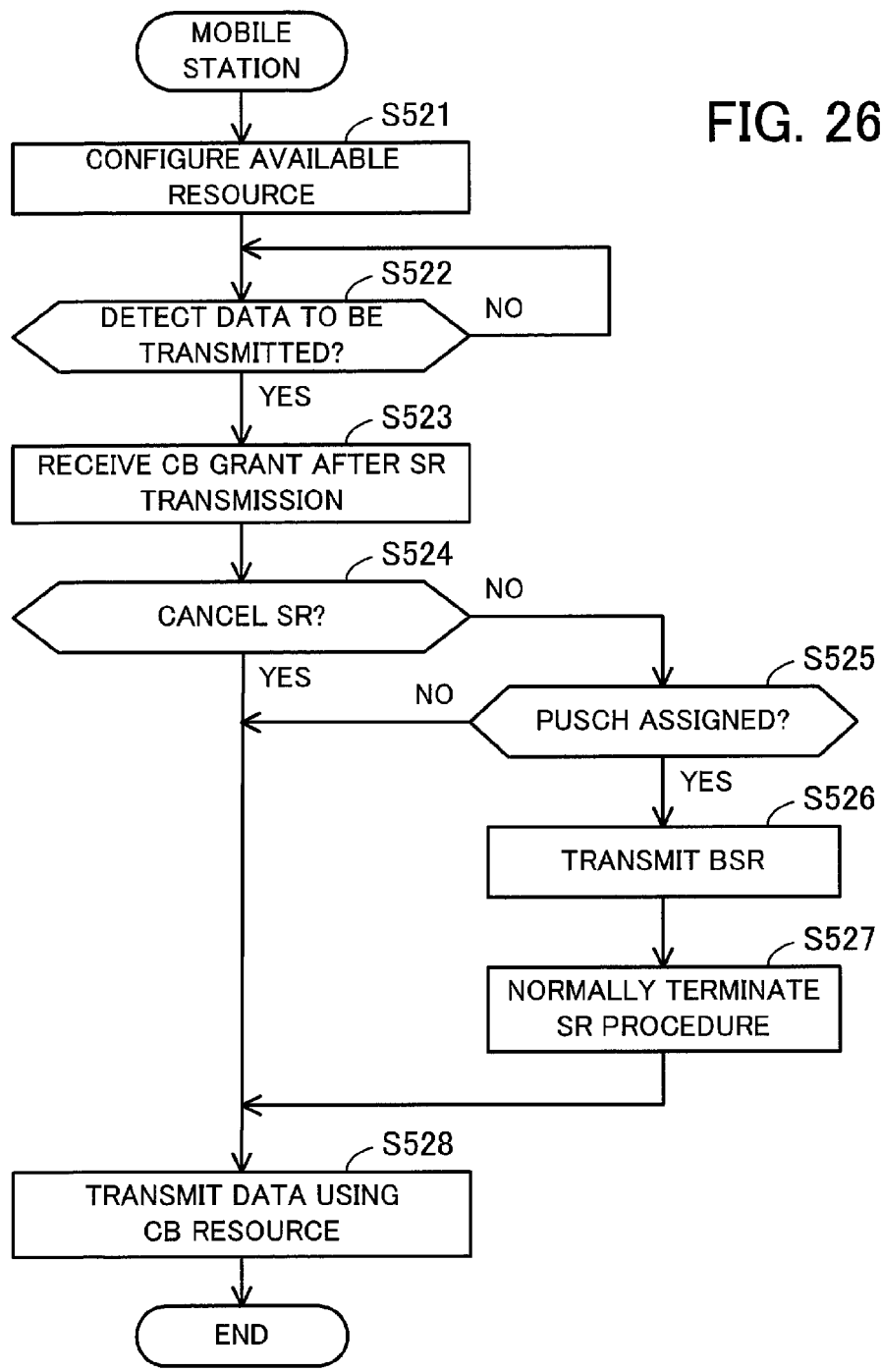
FIG. 26 is a flow chart of a process performed by a mobile station in the sixth embodiment.

FIG. 26 is a flow chart of a process performed by the mobile station in the sixth embodiment. The process indicated in FIG. 26 will be described in order of step number.

(Step S521) On the basis of notification from the base station 10, a control section 23 configures a PUCCH radio resource as an available UL radio resource.

(Step S522) The control section 23 determines whether or not it detects data to be transmitted to the base station 10. If the control section 23 detects data to be transmitted to the base station 10, then the control section 23 proceeds to step S523. If the control section 23 does not detect data to be transmitted to the base station 10, then the control section 23 repeats step S522. That is to say, the control section 23 waits until it detects data to be transmitted to the base station 10.

(Step S523) A transmission processing section 22 transmits a scheduling request using the PUCCH radio resource. Right (in a determined period of time, for example) after the transmission of the scheduling request by the transmission processing section 22, a radio communication section 21 receives a CB grant from the base station 10.

(Step S524) The control section 23 determines whether or not it cancels the procedure for the scheduling request method (whether or not setting is configured so as to cancel the procedure for the scheduling request method). If the control section 23 cancels the procedure for the scheduling request method, then step S528 is performed. If the control section 23 does not cancel the procedure for the scheduling request method, then step S525 is performed.

(Step S525) The control section 23 determines whether or not a PUSCH radio resource is assigned by the base station 10 as a response to the scheduling request transmitted in step S523. If a PUSCH radio resource is assigned by the base station 10, then step S526 is performed. If a PUSCH radio resource is not assigned by the base station 10, then step S528 is performed.

(Step S526) The transmission processing section 22 transmits a BSR to the base station 10 using the assigned PUSCH radio resource.

(Step S527) The control section 23 normally terminates the procedure for the scheduling request method.

(Step S528) The transmission processing section 22 transmits data to the base station 10 using a CB resource indicated by the CB grant of which the base station 10 notifies the radio communication section 21 in step S523.

Figure 27:
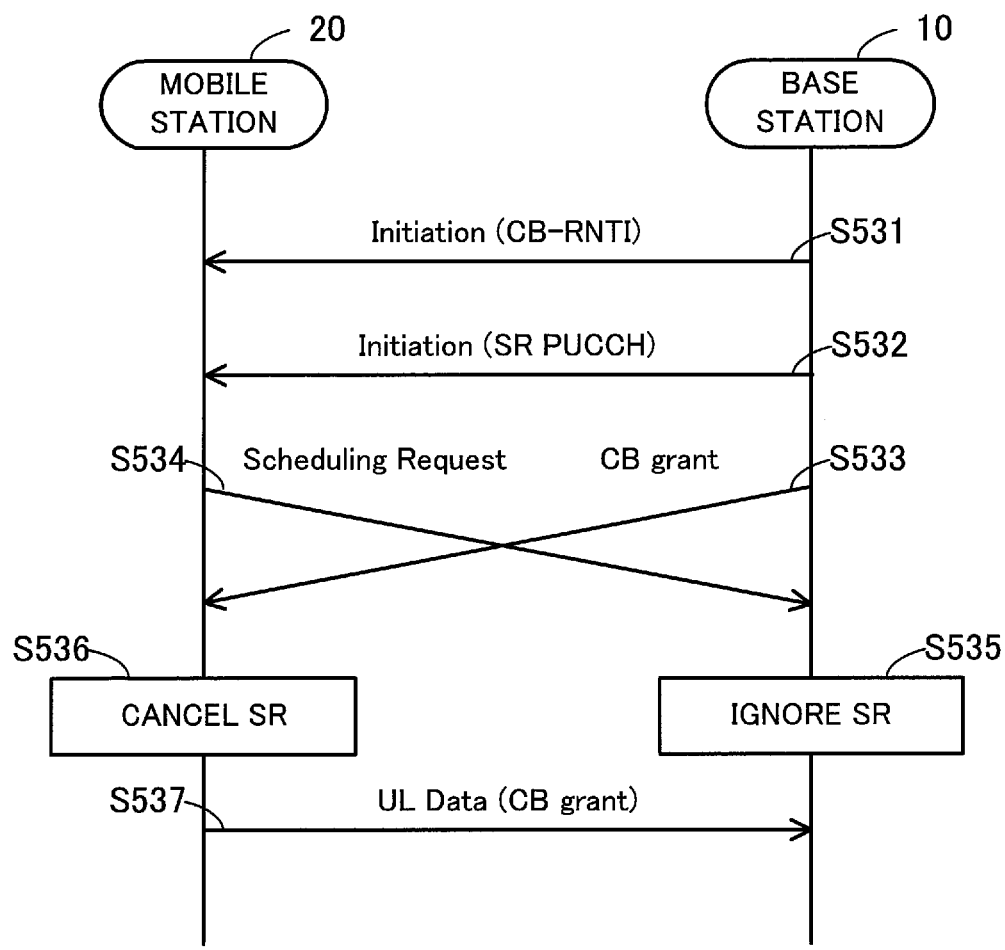
FIG. 27 is a first example of a sequence in the sixth embodiment.

FIG. 27 is a first example of a sequence in the sixth embodiment.

(Step S531) The base station 10 notifies the mobile station 20 of a CB-RNTI.

(Step S532) The base station 10 assigns a PUCCH radio resource to the mobile station 20 and notifies the mobile station 20 of the PUCCH radio resource assigned thereto.

(Step S533) The base station 10 notifies the mobile station 20 of a CB grant.

(Step S534) The mobile station 20 transmits a scheduling request to the base station 10 using the PUCCH radio resource. At this point of time the mobile station 20 has not received the CB grant yet.

(Step S535) The base station 10 ignores the scheduling request received from the mobile station 20. That is to say, the base station 10 does not assign a PUSCH radio resource.

(Step S536) The mobile station 20 cancels the scheduling request method.

(Step S537) The mobile station 20 transmits data to the base station 10 using a CB resource of which the base station 10 notifies the mobile station 20 in step S533.

In the example of a sequence indicated in FIG. 27, as has been described, the base station 10 receives the scheduling request and transmits the CB grant in the same period of time. In addition, the mobile station 20 transmits the scheduling request and receives the CB grant in the same period of time. In this case, the base station 10 or the mobile station 20 determines to stop the procedure for the scheduling request method. This way makes it unnecessary to transmit or receive a message for canceling the scheduling request method. As a result, radio resource consumption can be controlled.

Figure 28:
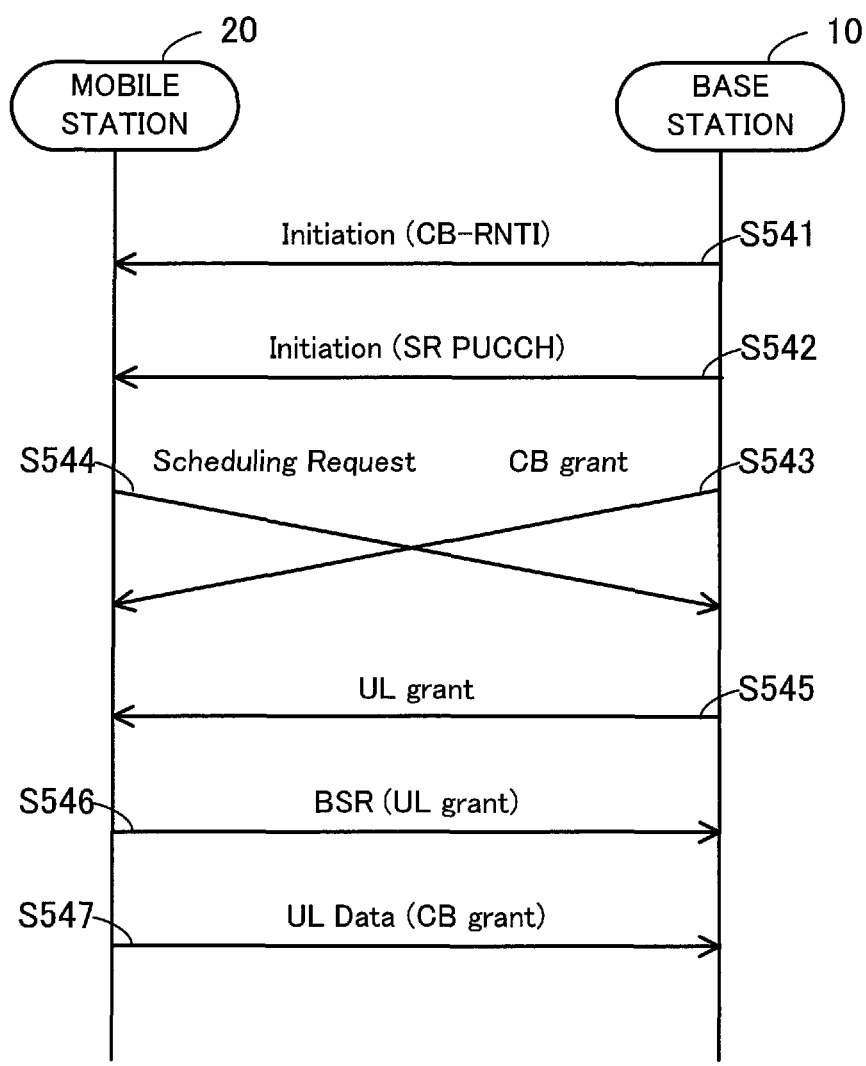
FIG. 28 is a second example of a sequence in the sixth embodiment.

FIG. 28 is a second example of a sequence in the sixth embodiment.

(Step S541) The base station 10 notifies the mobile station 20 of a CB-RNTI.

(Step S542) The base station 10 assigns a PUCCH radio resource to the mobile station 20 and notifies the mobile station 20 of the PUCCH radio resource assigned thereto.

(Step S543) The base station 10 notifies the mobile station 20 of a CB grant.

(Step S544) The mobile station 20 transmits a scheduling request to the base station 10 using the PUCCH radio resource. At this point of time the mobile station 20 has not received the CB grant yet.

(Step S545) The base station 10 assigns a PUSCH radio resource to the mobile station 20 and notifies the mobile station 20 of a UL grant.

(Step S546) The mobile station 20 transmits a BSR using the PUSCH radio resource assigned thereto in step S545. The mobile station 20 then cancels the scheduling request method.

(Step S547) The mobile station 20 transmits data to the base station 10 using a CB resource of which the base station 10 notifies the mobile station 20 in step S543.

In the example of a sequence indicated in FIG. 28, as has been described, the base station 10 receives the scheduling request and transmits the CB grant in the same period of time. In addition, the mobile station 20 transmits the scheduling request and receives the CB grant in the same period of time. In this case, the mobile station 20 transmits the BSR to the base station 10. By doing so, the mobile station 20 cancels the scheduling request method. The LTE specification also prescribes that a procedure for the scheduling request method should terminate by BSR transmission. Accordingly, there is no need to make a special determination for canceling the scheduling request method. This makes it easy to control the base station 10 and the mobile station 20.

In the above mobile communication system according to the sixth embodiment it is possible to perform switching to the contention based uplink access method even after the beginning of a procedure for the scheduling request method by the mobile station 20 or 20a. This prevents procedures for the scheduling request method and the contention based uplink access method from being performed in parallel. As a result, efficiency in UL data transmission from the mobile station 20 or 20a to the base station 10 is improved.

Seventh Embodiment

A seventh embodiment will now be described. The differences between the above second through sixth embodiments and a seventh embodiment will mainly be described and descriptions of the same matters will be omitted. In a mobile communication system according to a seventh embodiment, a procedure for the scheduling request method is canceled and a procedure for the contention based uplink access method is performed. This is the same with the sixth embodiment.

A mobile communication system according to a seventh embodiment can be realized by adopting the same structure that the mobile communication system according to the second embodiment illustrated in FIG. 2 has. In addition, a base station and a mobile station in a seventh embodiment can be realized by adopting the same structures that the base station 10 and the mobile station 20 in the second embodiment illustrated in FIGS. 6 and 7, respectively, have. A seventh embodiment will now be described by the use of the same reference numerals that are used in FIGS. 2, 6, and 7.

Figure 29:
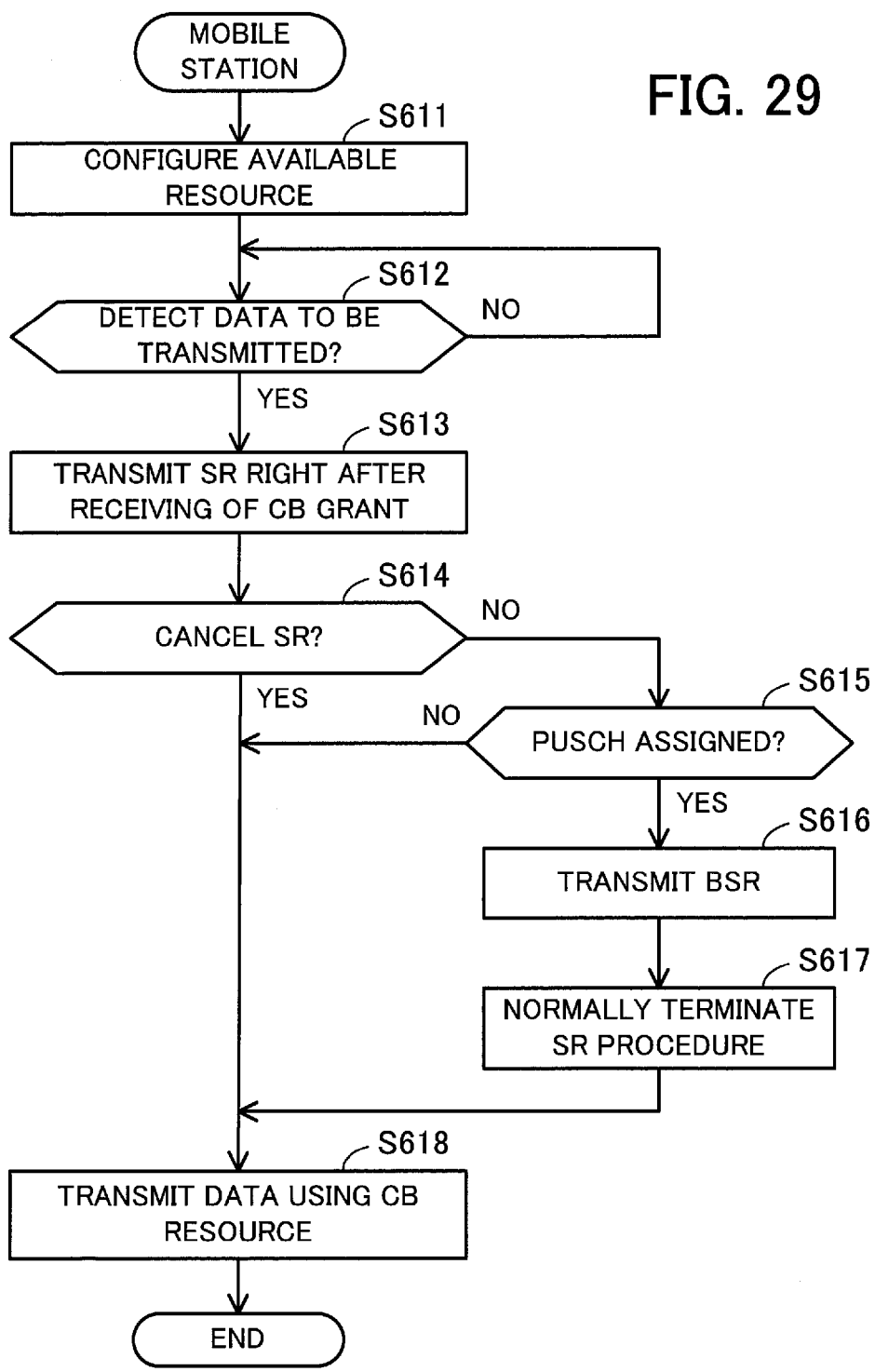
FIG. 29 is a flow chart of a process performed by a mobile station in a seventh embodiment.

FIG. 29 is a flow chart of a process performed by a mobile station in the seventh embodiment. Of steps S611 through S618, only the step S613 described below differs from the process indicated in FIG. 26 and performed by the mobile station in the sixth embodiment. A process performed by a base station in the seventh embodiment is the same as that indicated in FIG. 25 and performed by the base station in the sixth embodiment.

(Step S613) A radio communication section 21 receives a CB grant from a base station 10. A transmission processing section 22 transmits a scheduling request using a PUCCH radio resource right (in a determined period of time, for example) after the receiving of the CB grant. In the following case, for example, this may occur. While a CB grant is being handled, a scheduling request is transmitted. There is no time to execute control for stopping the transmission of the scheduling request.

Figure 30:
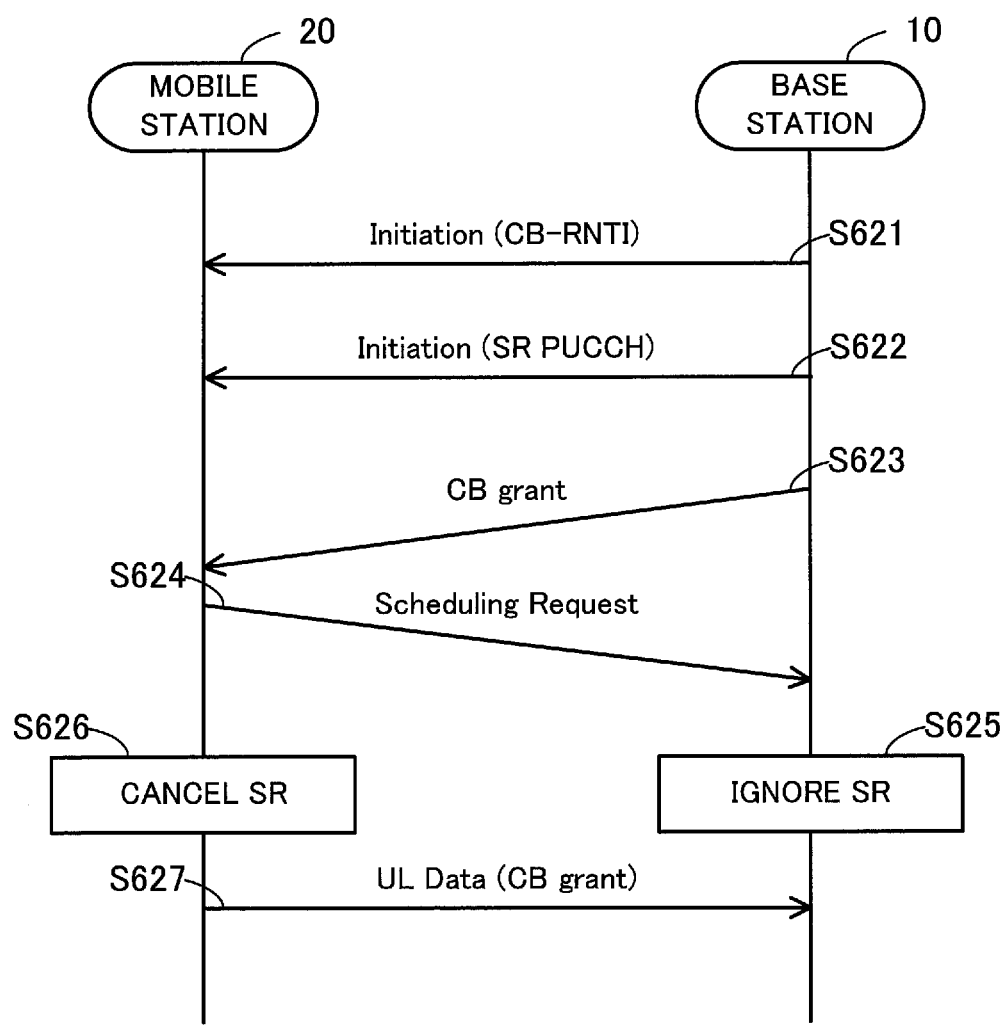
FIG. 30 is a first example of a sequence in the seventh embodiment.

FIG. 30 is a first example of a sequence in the seventh embodiment.

(Step S621) The base station 10 notifies the mobile station 20 of a CB-RNTI.

(Step S622) The base station 10 assigns a PUCCH radio resource to the mobile station 20 and notifies the mobile station 20 of the PUCCH radio resource assigned thereto.

(Step S623) The base station 10 notifies the mobile station 20 of a CB grant.

(Step S624) The mobile station 20 transmits a scheduling request to the base station 10 using the PUCCH radio resource. At this point of time it is assumed that the mobile station 20 has received the CB grant and that the mobile station 20 cannot stop the transmission of the scheduling request.

(Step S625) The base station 10 ignores the scheduling request received from the mobile station 20. That is to say, the base station 10 does not assign a PUSCH radio resource.

(Step S626) The mobile station 20 cancels the scheduling request method.

(Step S627) The mobile station 20 transmits data to the base station 10 using a CB resource of which the base station 10 notifies the mobile station 20 in step S623.

Figure 31:
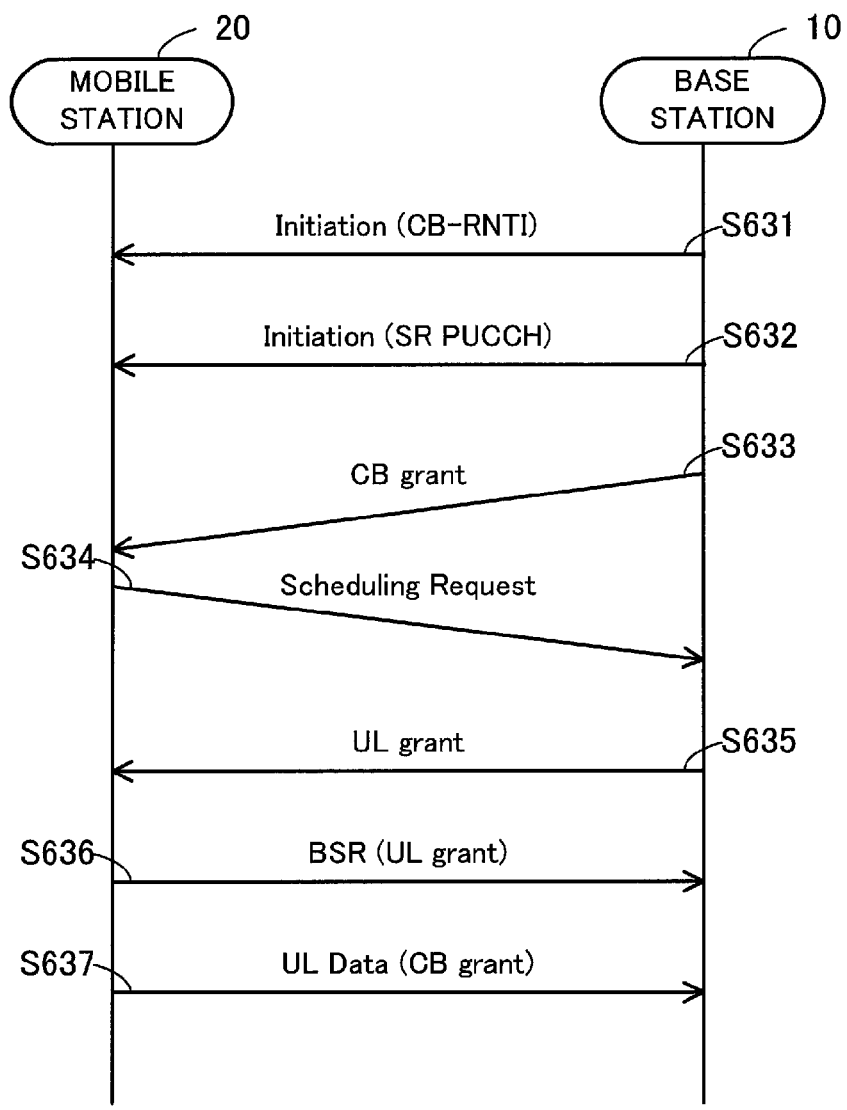
FIG. 31 is a second example of a sequence in the seventh embodiment.

FIG. 31 is a second example of a sequence in the seventh embodiment.

(Step S631) The base station 10 notifies the mobile station 20 of a CB-RNTI.

(Step S632) The base station 10 assigns a PUCCH radio resource to the mobile station 20 and notifies the mobile station 20 of the PUCCH radio resource assigned thereto.

(Step S633) The base station 10 notifies the mobile station 20 of a CB grant.

(Step S634) The mobile station 20 transmits a scheduling request to the base station 10 using the PUCCH radio resource. At this point of time it is assumed that the mobile station 20 has received the CB grant and that the mobile station 20 cannot stop the transmission of the scheduling request.

(Step S635) The base station 10 assigns a PUSCH radio resource to the mobile station 20 and notifies the mobile station 20 of a UL grant.

(Step S636) The mobile station 20 transmits a BSR using the PUSCH radio resource assigned thereto in step S635. The mobile station 20 then cancels the scheduling request method.

(Step S637) The mobile station 20 transmits data to the base station 10 using a CB resource of which the base station 10 notifies the mobile station 20 in step S633.

In the above mobile communication system according to the seventh embodiment it is possible to perform switching to the contention based uplink access method even after the beginning of a procedure for the scheduling request method by the mobile station 20 or 20a. This is the same with the sixth embodiment. This prevents procedures for the scheduling request method and the contention based uplink access method from being performed in parallel. As a result, efficiency in UL data transmission from the mobile station 20 or 20a to the base station 10 is improved.

Eighth Embodiment

An eighth embodiment will now be described. The differences between the above second through seventh embodiments and an eighth embodiment will mainly be described and descriptions of the same matters will be omitted. In a mobile communication system according to an eighth embodiment, a procedure for the scheduling request method is canceled and a procedure for the contention based uplink access method is performed. This is the same with the sixth and seventh embodiments.

A mobile communication system according to an eighth embodiment can be realized by adopting the same structure that the mobile communication system according to the second embodiment illustrated in FIG. 2 has. In addition, a base station and a mobile station in an eighth embodiment can be realized by adopting the same structures that the base station 10 and the mobile station 20 in the second embodiment illustrated in FIGS. 6 and 7, respectively, have. An eighth embodiment will now be described by the use of the same reference numerals that are used in FIGS. 2, 6, and 7.

Figure 32:
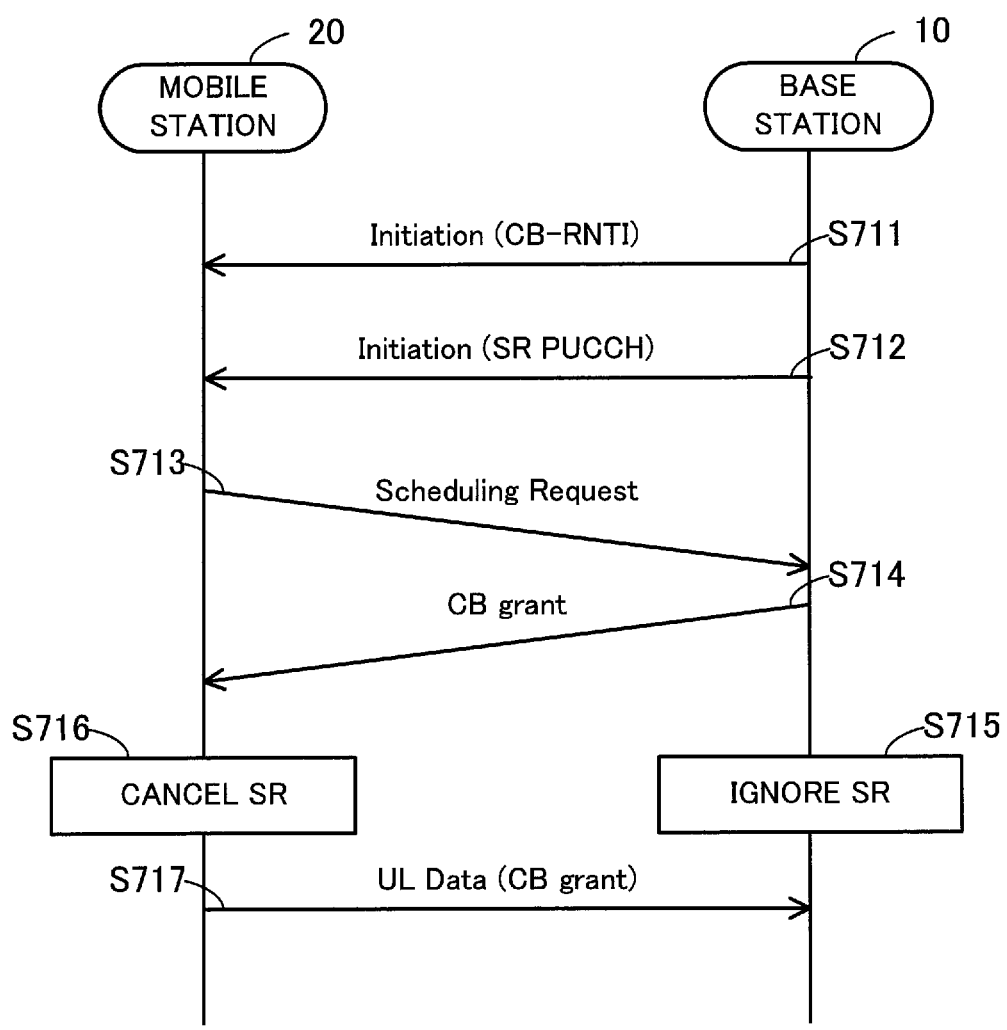
FIG. 32 is a first example of a sequence in an eighth embodiment.

FIG. 32 is a first example of a sequence in the eighth embodiment.

(Step S711) The base station 10 notifies the mobile station 20 of a CB-RNTI.

(Step S712) The base station 10 assigns a PUCCH radio resource to the mobile station 20 and notifies the mobile station 20 of the PUCCH radio resource assigned thereto.

(Step S713) The mobile station 20 transmits a scheduling request to the base station 10 using the PUCCH radio resource.

(Step S714) The base station 10 notifies the mobile station 20 of a CB grant. It is assumed that the base station 10 notifies the mobile station 20 of a CB grant right (in a determined period of time, for example) after the receiving of the scheduling request. In the following case, for example, this may occur. While a scheduling request is being handled, a CB grant is outputted. There is no time to execute control for stopping the outputting of the CB grant.

(Step S715) The base station 10 ignores the scheduling request received from the mobile station 20. That is to say, the base station 10 does not assign a PUSCH radio resource.

(Step S716) The mobile station 20 cancels the scheduling request method.

(Step S717) The mobile station 20 transmits data to the base station 10 using a CB resource of which the base station 10 notifies the mobile station 20 in step S714.

Figure 33:
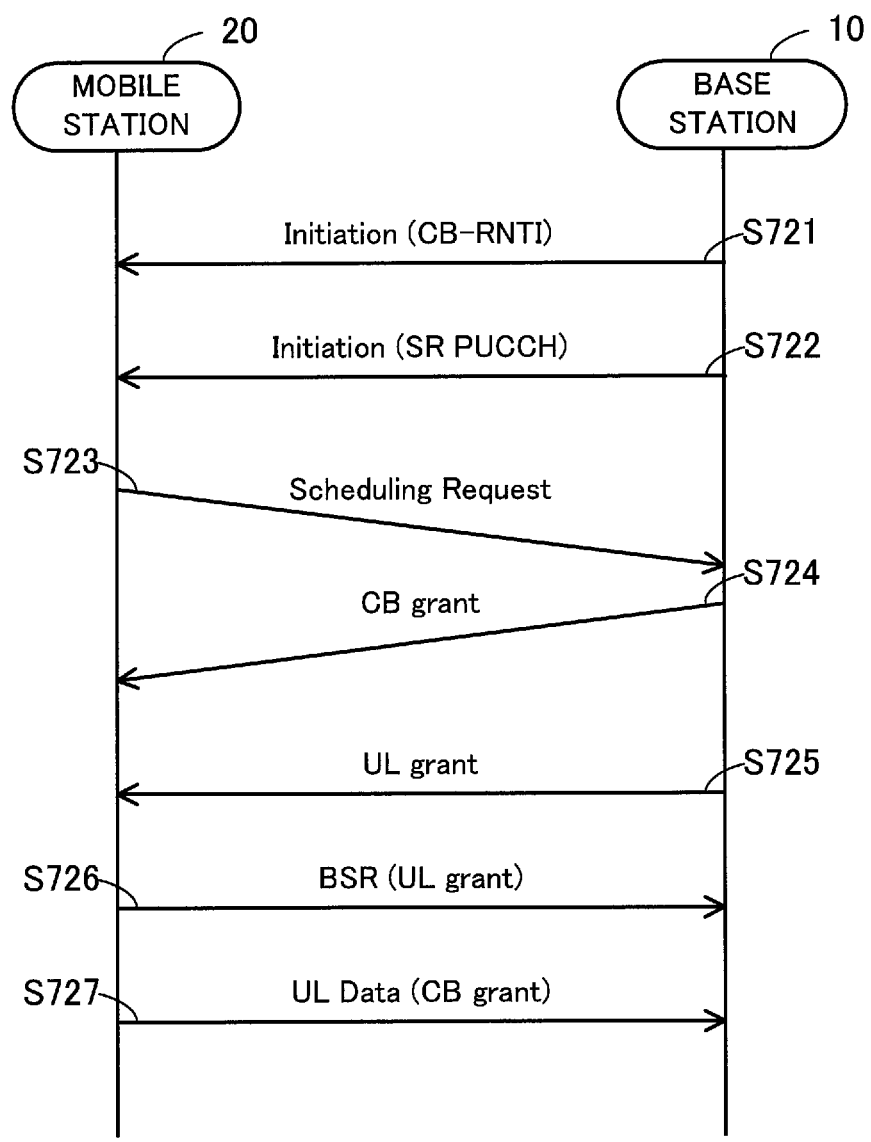
FIG. 33 is a second example of a sequence in the eighth embodiment.

FIG. 33 is a second example of a sequence in the eighth embodiment.

(Step S721) The base station 10 notifies the mobile station 20 of a CB-RNTI.

(Step S722) The base station 10 assigns a PUCCH radio resource to the mobile station 20 and notifies the mobile station 20 of the PUCCH radio resource assigned thereto.

(Step S723) The mobile station 20 transmits a scheduling request to the base station 10 using the PUCCH radio resource.

(Step S724) The base station 10 notifies the mobile station 20 of a CB grant. At this point of time it is assumed that the base station 10 has received the scheduling request and that the base station 10 cannot stop the notification of the CB grant.

(Step S725) The base station 10 assigns a PUSCH radio resource to the mobile station 20 and notifies the mobile station 20 of a UL grant.

(Step S726) The mobile station 20 transmits a BSR using the PUSCH radio resource assigned thereto in step S725. The mobile station 20 then cancels the scheduling request method.

(Step S727) The mobile station 20 transmits data to the base station 10 using a CB resource of which the base station 10 notifies the mobile station 20 in step S724.

In the above mobile communication system according to the eighth embodiment it is possible to perform switching to the contention based uplink access method even after the beginning of a procedure for the scheduling request method by the mobile station 20 or 20a. This is the same with the sixth and seventh embodiments. This prevents procedures for the scheduling request method and the contention based uplink access method from being performed in parallel. As a result, efficiency in UL data transmission from the mobile station 20 or 20a to the base station 10 is improved.

According to the above radio communication apparatus, radio communication system, and radio communication method, data transmission can be performed efficiently in the case of a contention based radio resource being set.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A radio communication apparatus used as one of a plurality of second radio communication apparatuses in a radio communication system in which a first radio communication apparatus receives data from the plurality of second radio communication apparatus, the radio communication apparatus comprising:

a detection section which detects a first radio resource that is assigned by the first radio communication apparatus and that can be used on a contention basis by the plurality of second radio communication apparatus for data transmission; and a transmission processing section which selectively performs, at the time of the first radio resource being detected, one of a first transmission method using the first radio resource for data transmission and a second transmission method using a second radio resource assigned by the first radio communication apparatus by which random access is performed for data transmission, wherein the transmission processing section preferentially selects and performs the first transmission method when information indicating permission to use the first radio resource is received.

2. The radio communication apparatus according to claim 1, wherein when the transmission processing section fails in a procedure for one of transmission methods between the first transmission method and the second transmission method, the transmission processing section aborts the procedure for the one transmission method and performs another transmission method.

3. The radio communication apparatus according to claim 1, wherein when the first radio resource and the second radio resource are included in a prescribed radio transmission unit, the transmission processing section selects a prescribed one of transmission methods between the first transmission method and the second transmission method.

4. The radio communication apparatus according to claim 1, wherein the transmission processing section selects one of the first transmission method and the second transmission method according to a data type.

5. A radio communication apparatus used as one of a plurality of second radio communication apparatus in a radio communication system in which a first radio communication apparatus receives data from the plurality of second radio communication apparatus, the radio communication apparatus comprising:
    a detection section which detects a first radio resource that is assigned by the first radio communication apparatus and that can be used on a contention basis by the plurality of second radio communication apparatus for data transmission and a second radio resource for a control channel assigned by the first radio communication apparatus; and
    a transmission processing section which selectively performs, at the time of the first radio resource and the second radio resource being detected, one of a first transmission method using the first radio resource for data transmission and a second transmission method using a third radio resource that is assigned by the first radio communication apparatus through an assignment request using the second radio resource for data transmission, wherein the transmission processing section preferentially selects and performs the first transmission when receiving information indicating permission to use the first radio resource.

6. The radio communication apparatus according to claim 5, wherein when the first radio resource and the second radio resource are included in a prescribed radio transmission unit, the transmission processing section selects a prescribed one of transmission methods between the first transmission method and the second transmission method.

7. The radio communication apparatus according to claim 5, wherein the transmission processing section selects one of the first transmission method and the second transmission method according to a data type.

8. The radio communication apparatus according to claim 5, wherein when the transmission processing section fails in a procedure for one of the first transmission method and the second transmission method, the transmission processing section aborts the procedure for the one transmission method and performs another transmission method.

9. The radio communication apparatus according to claim 5, wherein when the first radio resource is detected after transmitting the assignment request using the second radio resource, the transmission processing section aborts a procedure for the second transmission method and performs the first transmission method.

10. A radio communication apparatus used as a first radio communication apparatus in a radio communication system in which the first radio communication apparatus receives data from a plurality of second radio communication apparatus, the radio communication apparatus comprising:
    a control section which configures a first radio resource that can be used on a contention basis by the plurality of second radio communication apparatus for data transmission, and which selects making each second radio communication apparatus use the first radio resource or assigning to said each second radio communication apparatus a second radio resource used for transmitting a radio resource assignment request; and
    a notification section which selectively notifies said each second radio communication apparatus of information indicating permission to use the first radio resource or information indicating the assigned second radio resource according to a result of the selection by the control section,
    wherein when the information indicating permission to use the first radio resource is notified of, a transmission method using the first radio resource for data transmission is preferentially selected by said each second radio communication apparatus having received the information.

11. A radio communication system in which a first radio communication apparatus receives data from a plurality of second communication apparatuses, wherein
    the first communication apparatus configures a first radio resource which can be used on a contention basis by the plurality of second radio communication apparatus for data transmission;
    the plurality of radio communication apparatus performs a first transmission method using the first radio resource for data transmission and a second transmission method using a third radio resource that is assigned by the first radio communication apparatus through an assignment request using a second radio resource for a control channel assigned by the first radio communication apparatus for data transmission; and
    each of the plurality of second radio communication apparatus selectively performs one of the first transmission method and the second transmission method, and when receiving information indicating permission to use the first radio resource, preferentially selects the first transmission method.

12. A radio communication method in a radio communication system in which a first radio communication apparatus receives data from a plurality of second radio communication apparatus, the method comprising:
    configuring, by the first radio communication apparatus, a first radio resource that can be used on a contention basis by the plurality of second radio communication apparatus for data transmission;
    selectively performing, by each of at least a part of the plurality of second radio communication apparatus, one of a first transmission method using the first radio resource for data transmission and a second transmission method using a second radio resource for a control channel assigned by the first radio communication apparatus for assignment request transmission;
    preferentially selecting and performing, by said each second radio communication apparatus, the first transmission method when receiving information indicating permission to use the first radio resource; and
    assigning, by the first radio communication apparatus, a third radio resource for data transmission to a second radio communication apparatus which transmits an assignment request at the time of the second transmission method being performed.

* * * * *